(12) United States Patent
Weiser et al.

(10) Patent No.: US 7,752,259 B2
(45) Date of Patent: Jul. 6, 2010

(54) PUBLIC SERVICE MESSAGE BROADCASTING SYSTEM AND METHOD

(75) Inventors: Douglas "Bud" Weiser, Port Richey, FL (US); Kevin R. Preston, Gwent (GB); Mark Andrew Wood, Haslemere (GB)

(73) Assignee: Envisionit LLC, Montgomery, TX (US)

( * ) Notice: Subject to any disclaimer, the term of this patent is extended or adjusted under 35 U.S.C. 154(b) by 1122 days.

(21) Appl. No.: 11/057,704

(22) Filed: Feb. 14, 2005

(65) Prior Publication Data

US 2005/0261012 A1 Nov. 24, 2005

Related U.S. Application Data

(60) Provisional application No. 60/544,739, filed on Feb. 13, 2004.

(51) Int. Cl.
G06F 15/16 (2006.01)
H04M 11/04 (2006.01)
(52) U.S. Cl. .................. 709/203; 709/206; 709/207; 455/404.1
(58) Field of Classification Search .......... 707/104; 709/224, 204–207; 455/404.1
See application file for complete search history.

(56) References Cited

U.S. PATENT DOCUMENTS

| | | | |
|---|---|---|---|
| 4,415,771 A | 11/1983 | Martinez | |
| 5,278,539 A | 1/1994 | Lauterbach et al. | |
| 5,592,172 A | 1/1997 | Bailey et al. | |
| 5,893,091 A * | 4/1999 | Hunt et al. | 707/3 |
| 6,021,177 A | 2/2000 | Allport | |
| 6,084,510 A | 7/2000 | Lemelson et al. | |
| 6,112,075 A | 8/2000 | Weiser | |
| 6,169,476 B1 | 1/2001 | Flanagan | |
| 6,219,696 B1 | 4/2001 | Wynblatt et al. | |
| 6,240,360 B1 | 5/2001 | Phelan | |
| 6,346,890 B1 | 2/2002 | Bellin | |
| 6,463,273 B1 | 10/2002 | Day | |
| 6,480,578 B1 | 11/2002 | Allport | |
| 6,490,525 B2 | 12/2002 | Baron, Sr. et al. | |

(Continued)

FOREIGN PATENT DOCUMENTS

EP 0915598 9/1998

(Continued)

OTHER PUBLICATIONS

Recommendation 12 (WTDC-02), The World Telecommunication development Conference (Istanbul 2002).

(Continued)

*Primary Examiner*—Nathan Flynn
*Assistant Examiner*—Joshua Joo
(74) *Attorney, Agent, or Firm*—Polster, Lieder, Woodruff & Lucchesi, L.C.

(57) ABSTRACT

The public service message location broadcast system and method provides for broadcasting a message to communication receiving devices located within a defined geographic broadcast target area. The broadcast target area is defined by a broadcast agent using a broadcast agent webpage and a broadcast service bureau transmits the broadcast message to one or more local carriers who provide telecommunication service to the broadcast target area. The local carrier transmits the broadcast message to targeted users within the broadcast target area.

32 Claims, 10 Drawing Sheets

U.S. PATENT DOCUMENTS

| | | | |
|---|---|---|---|
| 6,493,633 | B2 | 12/2002 | Baron, Sr. et al. |
| 6,580,916 | B1 | 6/2003 | Weisshaar et al. |
| 6,650,902 | B1 | 11/2003 | Richton |
| 6,683,526 | B2 | 1/2004 | Bellin |
| 6,745,021 | B1* | 6/2004 | Stevens .................. 455/404.1 |
| 6,751,455 | B1 | 6/2004 | Acampora |
| 6,753,784 | B1 | 6/2004 | Sznaidder et al. |
| 6,785,551 | B1 | 8/2004 | Richard |
| 6,867,688 | B2 | 3/2005 | Lamb |
| 6,882,837 | B2 | 4/2005 | Fernandez et al. |
| 6,947,754 | B2 | 9/2005 | Ogasawara |
| 7,049,971 | B2* | 5/2006 | Guillory .................... 340/601 |
| 7,184,744 | B1* | 2/2007 | Schnabel ................ 455/404.2 |
| 7,194,249 | B2* | 3/2007 | Phillips et al. ........... 455/404.1 |
| 2002/0095333 | A1 | 7/2002 | Jokinen et al. |
| 2002/0107016 | A1 | 8/2002 | Hanley |
| 2002/0124252 | A1 | 9/2002 | Schafer et al. |
| 2003/0026240 | A1 | 2/2003 | Eyuboglu |
| 2003/0134622 | A1 | 7/2003 | Hsu et al. |
| 2003/0134651 | A1 | 7/2003 | Hsu |
| 2003/0137415 | A1 | 7/2003 | Thomson |
| 2003/0143974 | A1* | 7/2003 | Navarro ..................... 455/404 |
| 2003/0145064 | A1 | 7/2003 | Hsu et al. |
| 2003/0197615 | A1 | 10/2003 | Roche et al. |
| 2004/0103158 | A1* | 5/2004 | Vella et al. ................. 709/206 |
| 2004/0150518 | A1 | 8/2004 | Phillips et al. |
| 2004/0152493 | A1 | 8/2004 | Phillips et al. |
| 2004/0203562 | A1* | 10/2004 | Kolsrud .................. 455/404.1 |
| 2004/0247086 | A1 | 12/2004 | Menard et al. |
| 2004/0259568 | A1* | 12/2004 | Patel ...................... 455/456.1 |
| 2005/0030977 | A1 | 2/2005 | Casey et al. |
| 2005/0096065 | A1 | 5/2005 | Fleischman |
| 2005/0162267 | A1 | 7/2005 | Khandelwal et al. |
| 2005/0261012 | A1 | 11/2005 | Weiser |

FOREIGN PATENT DOCUMENTS

| | | |
|---|---|---|
| EP | 1071296 | 7/1999 |
| EP | 1032148 | 8/2000 |
| EP | 1515512 | 3/2005 |
| JP | 09098140 | 4/1997 |
| JP | 10336127 | 12/1998 |
| JP | 441719 | 9/1999 |
| JP | 2000165826 | 6/2000 |
| JP | 441720 | 8/2000 |
| JP | 2000244427 | 9/2000 |
| WO | 9605678 | 8/1995 |
| WO | 9849661 | 4/1998 |
| WO | 0030379 | 5/2000 |
| WO | 0145061 | 6/2001 |
| WO | 0157724 | 8/2001 |
| WO | 0189150 | 11/2001 |
| WO | 03077063 | 3/2003 |
| WO | 03071392 | 8/2003 |
| WO | 2005079421 | 2/2005 |

OTHER PUBLICATIONS

The Cellular-Emergency Alert Services Association Policy Statement, Aug. 5, 2002, may be seen at www.ceasa.us/news.htm.
Cellular Emergency Alert Services Association, Feb. 21, 2003, CellAlert Services Corporate Structure, may be seen at www.ceasa.us/news.htm.
News From Senator John Edwards, North Carolina, Apr. 3, 2003, Senate Okays Edwards Emergency Warning Bill, may be seen at www.ceasa.us/news.htm.
Canadians want Emergency-Location Services, by Dave Ebner, Apr. 11, 2003, may be seen at www.ceasa.us/news.htm.
Texas message warn of 'killer flu' hot spots, Apr. 20, 2003, may be seen at www.ceasa.us/ews.htm.
British Parliament Debates CellAlert Service for the UK, May 1, 2003, May Be Seen at www.ceasa.us/news.htm.
The Wall Street Journal Online, Local Governments Look to Cellphone-Based Alerts, Carl Bialik, Jun. 12, 2003, May Be Seen at www.ceasa.us/news.htm.
RCR, Cell-Broadcast Service Gets Second Look, Jeffrey Silva, Nov. 10, 2003, May Be Seen at WWW.CEASA.US/NEWS.HTM.
Canadian Contract No. 5007441, Jul. 23, 2003; http://72.14.203.104/search?q=cache:piSqEswBv74J:strategis.ic.gc.ca/epic/internet/inet-td.
CSEC "Wireless Implementation & Maintenance, Service Notification & Testing Notification Policies and Procedures", Apr. 19, 2002, http://www.911.state.tx.us/files/pdfs/resources/call_take.xls.
International Telecommunication Union, "Cell Broadcast Broker System" M. Wood, Cell Alert Services Corp., Feb 18, 2003, http://www.itu.int/itudoc/itu-t/workshop/ets/isd3-001.html.
$3^{rd}$ Generation Partnership Project TS 23.246, Release 6, Aug. 2004.
TeliaSonera, "Mobile Broadcast/Multicast Service (MBMS)", MediaLab, Aug. 2004. www.medialab.sonera.fi.
Messaging Network, Bercut Limited, "Broadcast for the Masses", Sergey Ermilov, Mar. 2, 2005, http://www.bercut.biz.
Bharat Sanchar Nigam Limited, "Value Added Services in GSM", Engineering Instruction, May 4, 2005; http://www.bsnl.co.in/service/mobile_voice_based_service.htm.
CEASA International, "Public Warnings via Cell Broadcast",Wood and Weiser, May 24, 2005, http://www.ceasa-int.org.
Stanford University, EE179 Introduction To Communications, Professor Andrea Goldsmith, Winter 2005, HTTP://WWW.STANFORD.EDU/CLASS/EE179/.
Engadget, "Dutch Testing Geo-Targeted SMS Emergency Broadcast System", Ricker, Oct. 8, 2005, http://www.engadget.com/entry/1234000590062252.
Global Amateur Radio Emergency communications conference, Tampere, Finland, Jun. 13-14, 2005, "What is 'Cell Broadcasting' and Why do I care, as a HAM?", Wood, www.rientola.fi/oh3ag/garec/documents/Cellalert.ppt.
OCG-EMTEL Archives, "Cell Broadcast Public Demonstration in USA Successful", Wood, Sep. 19, 2004, http://list.etsi.fr/scripts/wa.exe?A2=ind0409&L=ocg_emtel&T=0&F=&S=&P=693.
MobileIN.com Perspective, "History and Importance of Cell Broadcast", Wood, Sep. 2005, http://www.mobilein.com/Perspectives/Authors/CB_HistoryImportance.htm.
MobileIN.com Perspective, "Cell Broadcasting Technical Primer", Wood, Sep. 2005, http://www.mobilein.com/Perspectives/Authors/CB_Primer.htm.
CEASA, Cell Alert System Via Call Broadcast, Wood, Sep. 2005, www.eglobalconf.net/speeches/MarkWood.ppt.
CEASA International, "Welcome to CEASa USA", Ceasa Admin, Jun. 12, 2004, http://ceasa-international.com/usa/index2.php?option=comcontent&task=view&id=1&Ite.
CEASA, Welcome to CEASa USA, Ceasa Admin, Jun. 12, 2004, http://ceasa-international.com/usa/index2.php?option=comcontent&task=view&id=1<e.
CEASA, "Text Message broadcasts could provide disaster Alerts" Jul. 28, 2005, http://ceasa-international.com/usa/index2.php?option=comcontent&task=view&id=1&Ite.
CEASA; News and Events, "News", Jan. 14, 2005-Jun. 2005, http://www.ceasa-international.org/news.html.
SMS News, "Text Message Broadcasts Could Provide Disaster Alerts", Jan. 7, 2005, http://www.sendsmsnow.com/newspage.php?id=44.
Newscientist.Com, "Tex Message Broadcasts Could Provide Disaster Alerts", Jan. 6, 2005, http://www.newscientist.com/article.ns?id=dn6852.
Deaf Today, Disability Group Backs Cingular/AWS Merger, Silva, Jun. 4, 2004, http://www.deaftoday.com/newws/archives/004848.html.

* cited by examiner

PUBLIC SERVICE MESSAGE BROADCASTING SYSTEM AND METHOD

CROSS REFERENCE TO RELATED APPLICATIONS

This application claims priority to Provisional U.S. Application Ser. No. 60/544,739, filed Feb. 13, 2004, the entire disclosure of which is incorporated herein by reference.

FIELD OF THE INVENTION

The present invention relates to emergency message broadcast systems and in particular location-specific public service message broadcasting.

BACKGROUND OF THE INVENTION

With the events of 9/11, there has been increased concern with the ability of present systems for providing public service broadcasting of messages and warnings to the public. Existing public service warning systems are antiquated and provide only limited access to the public who may be in need of knowing of potential emergencies or danger. Additionally, existing systems do not provide for location-based notification or broadcast messages.

As such, there is a need for an improved method and system for providing timely information to the public related to potential hazards affecting them. One suggested solution is the utilization of the subscription-based Short Message Service (SMS) messaging capability for mass messaging using mobile telephones and compatible devices. However, SMS systems and technology have significant technical limitations and experience with such systems has been disappointing due to significant delays in the delivery of SMS messages and negative impacts to the networks due to congestion.

Short Message Service (SMS) is only offered or available on a limited basis. This is due to the limited technical and network support for the service and is also due to the service being offered by Mobile Service Providers and wireless network providers on a subscription basis. As such, use of the SMS service capability for emergency broadcasting is very limited.

Additionally, the use of SMS technology for broadcasting requires enormous network infrastructure utilization. A telecommunication system can suffer from congestion, not only in its voice traffic channels, but also in its narrow-band data channels used for the SMS service. To send an SMS message, network components are utilized to provide an SMS message call set up for each individual SMS message recipient. In order to send a single SMS message, all SMS message call processing procedures have to be repeated for each and every message, one by one, for all intended recipients. A single SMS message requires signaling and processor capacity and utilization similar to that required to establish a voice call. As such, the impact on network resources for broadcasting SMS messages to thousands of recipients is the same as having thousands of phone users attempt to initiate a voice call at the same time. Telecommunication networks are not designed or deployed to handle such high levels of simultaneous call attempts.

When an SMS message is transmitted, the SMS message is signaled to an SMS center of the telecommunication service provider. The SMS center acknowledges each and every requested SMS message individually and attempts to deliver the SMS message through an interrogation of the Home Location Register (HLR) of the telecommunication service.

An HLR is a data base which registers or keeps track of the presence of a subscriber's mobile unit For example in a Global System for Mobile Communication (GSM) network, HLR converts the dialed number into the 15-digit International Mobile Subscriber Identifier (IMSI) number of the Subscriber Information Module (SIM) card, then queries the database and determines whether the intended SMS message recipient is currently attached to the network and if so, to which network switch the user is attached. The HLR is queried using the telecommunication signaling network.

If an intended SMS message recipient is located or attached to a switch in the telecommunication service provider's network, the particular network switch is signaled over the telecommunications signaling network to set up the SMS message call. The Visitor Location Register (VLR) associated with that switch is also queried to see if the called subscriber is still attached to the network and if so, which coverage cell is providing service to the subscriber. A Mobile Switching Center (MSC) then pages each and every mobile unit within the whole location area, which can be several hundreds of cells. In some cases, if the mobile unit does not reply, the whole area served by the MSC area is paged, which in many instances requires the paging of several thousands of cells.

When the mobile unit replies by sending an access burst to the cell transceiver currently serving the mobile unit, the cell site allocates a stand-alone dedicated control channel (SDCCH) to perform SMS call set up with the mobile unit. Next, a cipher key is sent by the Home Location Register (HLR)/Authentication Center (AUC) to the Base Station of the transmission cell. Once the cipher key is successfully received and acknowledged, the SMS message is sent over the control channel to the mobile unit. The SMS message transmission utilizes about 7 seconds of control channel time per transmitted SMS message.

When a VLR has identified that a mobile is in the service area of a switch, that switch (MSC) will select a Roaming Number from its pool of available roaming numbers, and signal this to the MSC/HLR so that call set up can continue. In the case of a large number of messages being attempted, a large number of roaming numbers will have to be assigned, perhaps exhausting the range of such numbers.

Each SMS message is a narrow-cast message in that each message is generated and transmitted via the SMS Center to a particular telecommunication user or mobile unit. The SMS message is delivered, as discussed above, to the intended recipient by capable networks wherever the intended recipient is located, independent of geographic area or location.

As such, SMS messaging for emergency-based messaging requires that SMS messages be created and sent to each mobile unit even though the particular user phone is not located in the particular geographic area in which the emergency is located. SMS service is not capable of location-specific messaging.

Additionally, SMS messaging places a considerable call processing load on the telecommunication system and infrastructure considering that the above process is multiplied by the demand of thousands or tens of thousands of SMS call set up requests at the same time. The potential initiation of broadcast SMS volumes will not only affect network resources for SMS messaging, but also negatively affect ability of the telecommunication networks to set up and support voice traffic during any period of message broadcasting as these resources are shared by both services.

As a further example of the limitation of existing solutions to message broadcasting, the well deployed standard digital Global System for Mobile Communications (GSM) system typically deploys in a single GSM cell several transceivers. A typical GSM cell configuration includes between 6 and 12 transceivers. Each such transceiver includes 8-timeslots. Each timeslot supports a single phone call.

In such an arrangement, one of the transceivers is selected to be the Broadcast carrier. The Broadcast carrier transceiver is configured differently, having one timeslot dedicated to broadcast SMS messages and paging and another one which is utilized for 8 control channels, which are referred to as Stand-Alone Dedicated Control Channels (SDCCH). The SDCCH channels carry out control and call set-up functions and carry the SMS traffic that is not normally handled by the traffic channels on the other timeslots.

However, in this prior art system, SMS and Wireless Access Protocol (WAP) messaging utilize capacity on these channels making them unavailable for other purposes such as voice call set up. Additionally, each of the SDCCH channels can only handle a limited number of SMS and/or WAP transmissions. As such, during heavy messaging, the related high volumes of messaging traffic may have a negative affect on other services including the set up of voice calls.

To compensate for these and other SMS messaging limitations, dynamic channel allocation was developed. Dynamic channel allocation utilizes an additional traffic channel which is converted into another 8 control channels for the duration of the peak SMS or WAP messaging loads. However, this results in the loss of the traffic channel for voice communications.

Further strategies have included the immediate assignment to a traffic channel. In this system, when a voice call is attempted, the voice call is sent to a traffic channel directly where signaling will be performed on the traffic channel. This, however, occupies the traffic channel for a longer time than would otherwise be the case. There is a limit on the number of traffic channels that can utilize this feature. In most cases, only one traffic channel is converted thereby limiting the solution to 8 new SDCCH channels. The impact of call failure due to control channel usage depends on the traffic capacity of the cell. In high density cells, when a large quantity of SMS messaging traffic is offered, congestion occurs due to the each cell having over one hundred traffic channels within the cell.

In operation, the telecommunication service provider addresses this limitation by throttling the SMS messaging rate so that it is manageable and does not create congestion problems. However, such message load management negatively impacts the opportunity for using SMS messaging for broadcasting emergency messages to users of those networks. Throttling often significantly delays the delivery of the SMS message, even though its timing delivery in an emergency is critical. Furthermore, if a message fails to be delivered, the SMS center repeatedly attempts to deliver the message, thereby causing further congestion and message backlog.

Additionally as noted above, SMS messaging is not location based and as such does not send messages to intended recipients located within a defined geographic location. Since many SMS subscribers will be "messaged" independent of their location (e.g., subscriber is roaming outside the home coverage area), many of the generated SMS messages are sent to users who are not in the intended target broadcast area.

In the alternative, some next-generation phone systems include a basic cell-based broadcasting capability, e.g., GSM, CDMA, PDC and UMTS. In such systems, the cell broadcasting capability allocates a portion of each timeslot bandwidth capacity in each cell as a reserved broadcast timeslot. While the cell broadcast capability is included in new telecommunications infrastructure being deployed, cell broadcasting systems and services have not been developed which effectively utilize the technology.

SUMMARY OF THE INVENTION

The embodiments of the present invention provide one or more improvements over the prior art.

In one aspect, the invention comprises a public service message broadcast system providing a broadcast message to a broadcast target area. The system includes a broadcast agent webpage that receives broadcast agent input defining the broadcast target area and the broadcast message. The system also includes a carrier broadcast center that transmits the broadcast message to the broadcast target area. The system further includes a broadcast service bureau that hosts the broadcast agent webpage and is coupled to the carrier broadcast center. The broadcast service bureau receives the broadcast agent input and transmits the broadcast message to the carrier broadcast center.

In another aspect, the invention comprises public service message broadcast service bureau system providing a broadcast message to a broadcast target area. The system includes a first communication interface coupled to a first network and a second communication interface coupled to a second network. The system also includes a webpage that receives broadcast agent input defining the broadcast target area and the broadcast message. The system further includes a computer hosting the webpage over the first communication interface. The computer also receives the broadcast agent input and transmits the broadcast message to a local broadcast system over the second communication interface.

Yet in another aspect, the invention comprises a website interface system for a public service message broadcasting system. The website interface includes a broadcast agent device with a display for displaying a broadcast agent webpage. The website interface also includes a webpage host that communicates with the broadcast agent device and establishes a communications interface between the broadcast agent device and the webpage host. The broadcast agent device receives broadcast agent input that defines the broadcast target area and the broadcast message. The broadcast agent device also transmits the broadcast target area and the broadcast message to the webpage host over the communication interface.

In another aspect, the invention comprises a method of public service broadcast messaging to a broadcast target area. The method includes hosting a broadcast agent webpage and receiving a broadcast target area and a broadcast message from the broadcast agent webpage. The method also includes transmitting the broadcast message to the broadcast target area.

Further aspects of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

Corresponding reference characters indicate corresponding parts throughout the several views of the drawings.

DETAILED DESCRIPTION

Figure 1:
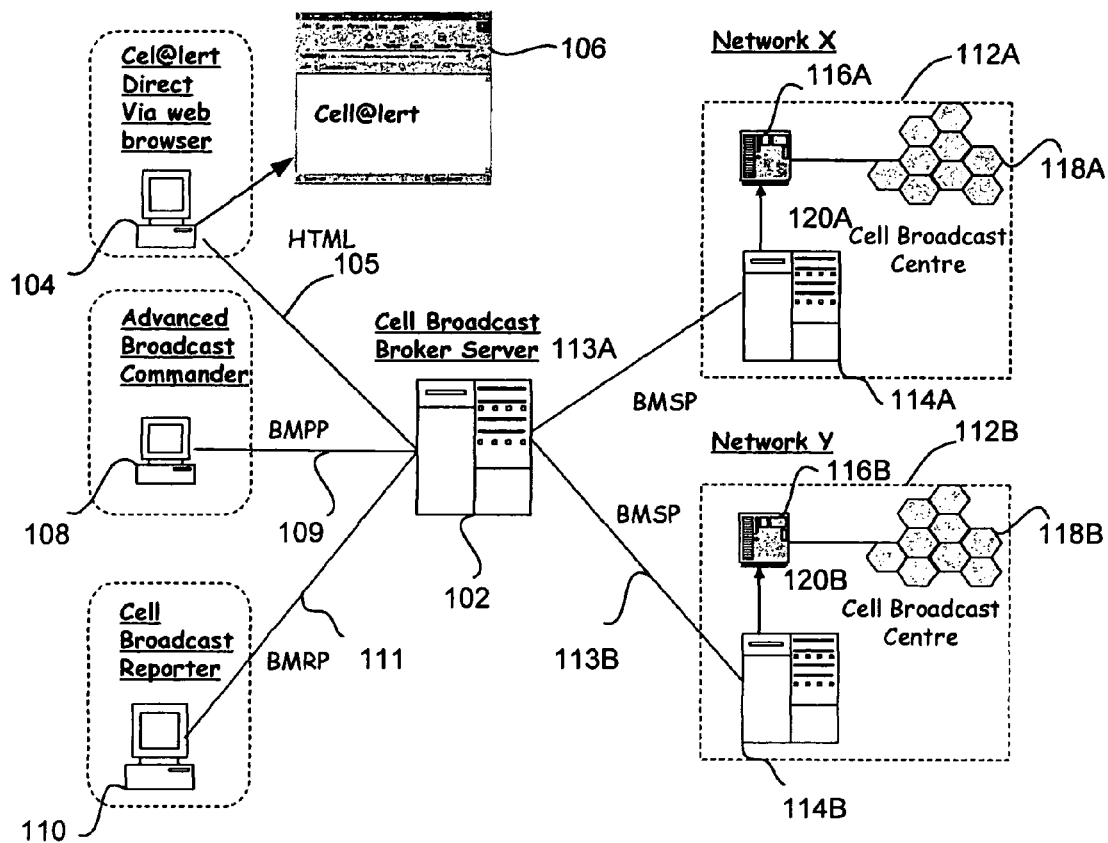
FIG. 1 is a functional block diagram of a public service message location broadcast system according to one embodiment.

The following description is merely exemplary in nature and is in no way intended to limit the invention, its application, or uses.

The public service message location broadcasting system (PLBS) according to one or more embodiments of the invention provide for an improved system and method for public service broadcast messaging. A public service message location broadcasting system (PLBS) operator provides a Broadcast Agent Web Portal or Webpage or other similar Graphical User Interface (GUI), implementation and maintenance of the networks' cell-broadcast messaging components, networks and platforms, administration and operation of the public service message location broadcasting system, and interfaces to local telecommunication service providers including mobile unit service providers.

According to one embodiment in the event of a serious public emergency, a short text message is sent over the location broadcast channel. A mobile unit or Broadcast Agent phone, which is configured to receive location-based broadcast messages, while in the idle mode and located in the predefined cell, receives the broadcast message and displays the message on its screen.

Location-based message broadcasting is transmitted from the predefined cell in a downlink only mode and therefore, unlike current SMS services, does not require functionality or network resources from the mobile services provider or from any portion of the mobile service provider's mobility management resources, e.g., HLR, VLR, etc.

A public service message location broadcasting system provides for the simultaneous sending of public service messages to millions of subscribers with less impact on the supporting networks than a single SMS-message. As such, minimal to no network congestion will result.

A public service message location broadcasting system (PLBS) receives emergency or public service messaging and identification of the target broadcast area from public service or government entities. The PLBS provides location-based broadcast message enablement, security, multi-carrier interoperability and connectivity to the telecommunication service providers offering services within the target broadcast area.

A public service message location broadcasting system and method according to one or more embodiments provides for the development, transmission, delivery and display of a message that is an official government-to-citizen information broadcast to all compatible telecommunication receiving devices in, or entering, a predefined at-risk geographic location or area.

The PLBS system sends any public service or emergency information associated with an event, as determined by authorized messaging entities that may affect public safety. These include, but are not limited to, utility outages, missing child alerts, severe weather warnings, flood warnings, and terrorist threat warnings. The messages are broadcast by public service message location broadcasting systems participating with local telecommunication networks.

Unlike other emergency messaging services that require the recipient's identity, a predetermined fixed delivery location, and usually the payment of a service fee, the public service message location broadcasting system uses broadcast messaging technology to reach an unlimited number of people in real time, with no pre-event recipient action required and to phones that are setup to receive the message channel.

The public service message location broadcasting system uses cell-broadcast SMS (C-BSMS) technology to provide a message or alert to a single cell geographic location, a neighborhood, a city, or an entire nation with minimal impact to participating telecommunication networks.

Local telecommunications service providers such as mobile or cellular telephone service carriers provide the local telecommunications infrastructure and interfacing technologies that enable the public service message location broadcasting system to transmit public messages in a timely manner to the public that may be at risk using standard and commonplace mobile telephone units.

The public service message location broadcast system and methods described herein provide the functions and steps necessary to ensure that the Broadcast Agents are authorized to send the requested broadcast messages to the defined broadcast target area. The PLBS configuration described herein provides internal controls for insuring that the network and components are secure and that messages are authorized prior to transmittal. The public service message location broadcast system provides the interface to the Broadcast Agents to ensure simple and timely definition of the broadcast target area, the message, and the authentication of the Broadcast Agent. The public service message location broadcast system also provides the interconnectivity and functionality for interfacing to participating telecommunication service providers that provide for the delivery of the broadcast message to the broadcast target area.

The public service message location broadcasting system consists of five parts:

1. Public Service Location Broadcast Service Bureau
2. Broadcast Agent Terminal/Web Portal/Web Page
3. Public Service Message Broadcast Controller/Distributor
4. Carrier Broadcast Center
5. Public Service Location Broadcast Reporter One exemplary embodiment of a public service location broadcasting system is illustrated in FIG. 1. A public service location broadcast service bureau 102, labeled In FIG. 1 as a location broadcast broker server by way of example, includes interfaces to various system components and to the various networks in which a message can be broadcast to mobile units located with a defined target area or location.

One or more broadcast agent access devices 104 can be connected to the public service location broadcast service bureau 102 (PLBS-SB) and configured to provide a cell@lert display 106 to a Broadcast Agent. The cell@lert display, as described herein, includes an interface enabling the Broadcast Agent to input a message and define a geographic target area for delivery of the message. The cell@lert display 106 can be in the form of a webpage that is hosted by the service bureau 102 in an HTML format (as shown) or another computer server (not shown). In other embodiments, the Broadcast Agent Access Device 104 may be a computer or personal computer and the cell@lert display can be a display generated by locally supported software residing on the Broadcast Agent's personal computer. The broadcast agent access device 104 can be coupled to the service bureau 102 via any type of suitable data communication facility 105 using a variety of data communication protocols (not shown).

A broadcast commander 108 or command module can be coupled to the service bureau 102 and provide administrative or "command" control over one or more operations of the public service location broadcasting system 100. A Broadcast Administrator or Operator can utilize the broadcast commander 108 to set access limitations or restrictions on Broadcast Agents accessing the broadcast agent access device 104 as well as other administrative functions for the system 100. The interface between the broadcast commander 108 and the service bureau 102 can utilize a broadcast messaging proprietary protocol (BMPP) that is transmitted over a communication facility or link 109. Such communication link 109 can be any type of communication facility suitable to support communications and can utilize any compatible communication protocol (not shown).

A public service location broadcast reporter 110 (shown as cell broadcast reporter) can also be coupled to the service bureau 102 and interface with the service bureau using a broadcast message reporting protocol (BMRP). The Location Broadcast Reporter 110 may be configured to store broadcast messaging data and to prepare and produce reports related to past, pending, and future broadcast messages in one or more areas. The Location Broadcast Reporter 110 may be located at a disaster management office, a control room, or the PLBS-SB 102.

Figure 2:
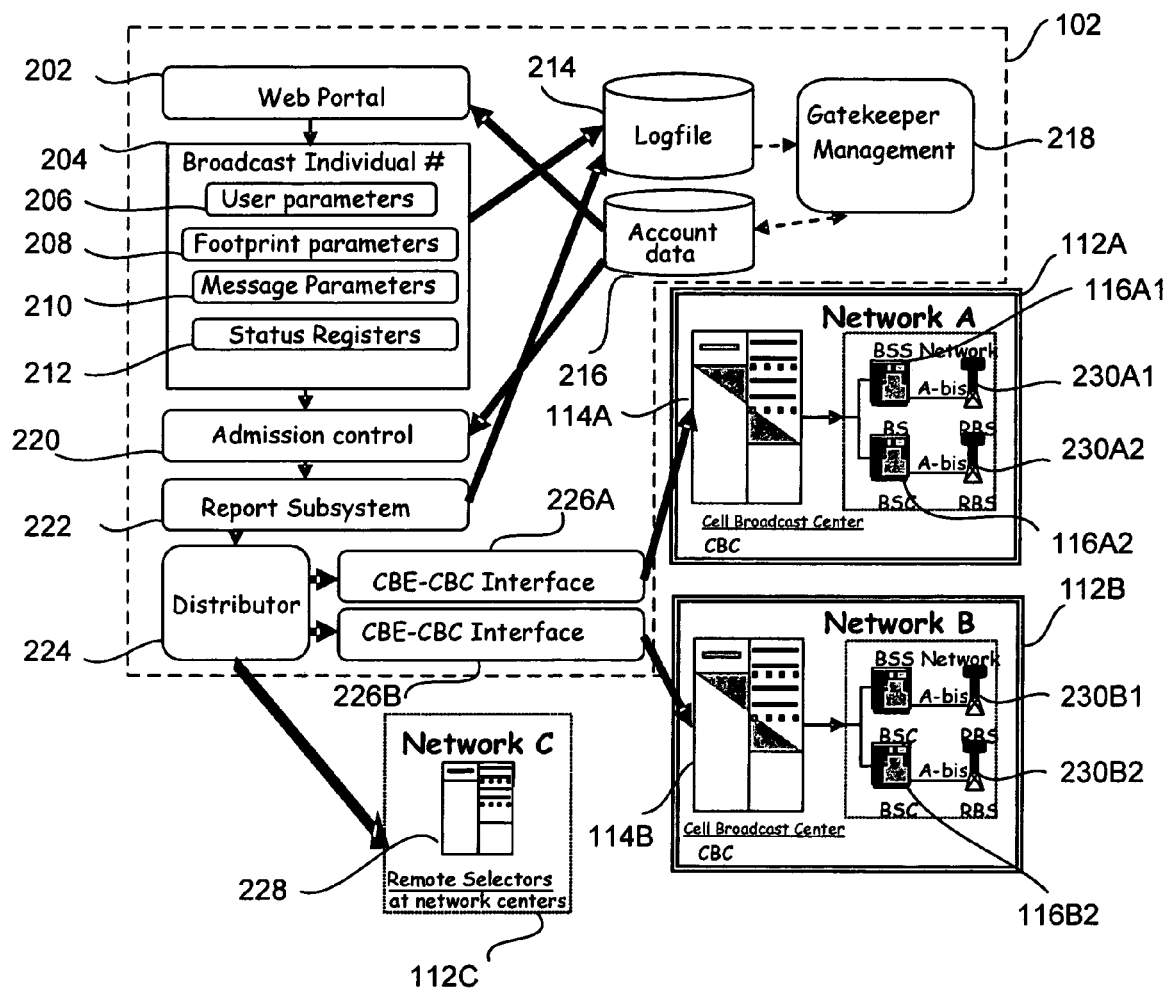
FIG. 2 is a second functional block diagram of a public service message location broadcast system according to one embodiment.

The service bureau 102 can be communicatively coupled to one or more local carrier networks 112. While FIG. 1 illustrates two cellular carrier networks 112A and 112B connected to service bureau 102, in other embodiments, the service bureaus 102 can be coupled to a plurality of various communication networks, including, but not limited to cellular, wireless, wireline, satellite, wide area, metropolitan area, and local area networks, including a combination of public and/or private networks. Each coupled network 112 includes a network or carrier broadcast center 114 (or network broadcast module and also referred herein as a CBC 114 and in one embodiment as a cell broadcast center 114 as in FIGS. 1 and 2 and includes the foreign spelling of center e.g., "centre" as shown in FIGS. 1 and 2) that receives a broadcast message and local delivery instructions via a data communication link 113 from the service bureau 102. Such data communication link 113 can be any type of communication facility operating any one of a variety of suitable communication protocols capable of negotiating access and delivery of the message to be broadcast. For example, as shown in FIG. 1, a broadcast message submission protocol (BMSP) can be utilized in the communication between the service bureau 102 and one or more of the networks 112.

The Public Service Location Broadcast Service Bureau (PLBS-SB) 102 is located at a PLBS Operator's location which is preferably secure. The PLBS-SB 102 ensures the authenticity of the message and the authority of the sender to create such a message. Administrative Operators establish the User Profile in the Administration Subsystem to control Broadcast Agent rights and privileges. The signal from the Broadcast Agent Terminal 104, for example, at the police station, to the PLBS-SB 102, would only indicate the geographical area to be covered, plus the message. PLBS-SB 102 then sends the broadcast request signal to the Carrier Broadcast Center 114 at the office of each local carrier concerned.

PLBS-SB 102 may also perform a billing gateway administrative function as may be required to allocate costs. PLBS-SB 102 can utilize stored location broadcast messaging data and may have access, in one embodiment, to the geographical coverage requested by the Public Service Broadcast Agent. PLBS-SB 102 may be configured to determine or calculate population density of the broadcast area. PLBS-SB 102 may also manage customer account data, authentication, security, and administration and application of restrictions on a customer, jurisdiction, or Broadcast Agent.

For each account, a Broadcast Agent Administrator is appointed and provided access to the Advanced Broadcast Commander 108. A person of whose authority is recognized, such as a police chief or city manager would be suitable for such a role, though he may likely delegate this to someone in the Information Technology services group. The Broadcast Agent Administrator (or his delegate) has under his control several Broadcast Agent accounts, which have authority under him, but no greater authority. For example, the jurisdiction of a Broadcast Agent is within that of a Broadcast Agent Administrator.

Using the PLBS-SB 102, an Administrative Operator checks and/or verifies the authenticity of the Broadcast Agent Administrator and defines or validates the jurisdictional area of the Broadcast Agent's organization. The Administrative Operator administers customer and agent profiles within the PLBS 102. The Administrative Operator has secure access for administering the operational and administrative data and profiles for operation of the PLBS-SB 102. Best practices and Memoranda of Understanding (MOU) are defined by government agencies and/or local carriers. For example, a Coast Guard commander may have access only to coastal areas, though the area would be very large. In another example, a River Authority manager would have a guideline indicating that he could warn of imminent flooding, but not urge people to conserve water usage. The river authority Jurisdiction may include only rivers, waterways and flood plains.

Any data and/or factor may be input to the PLBS-SB 102 by the Administrative Operator and used by the PLBS-SB 102 for system operation. Each Broadcast Agent Administrator has an account to which the Broadcast Agent belongs. The account is updated to indicate usage accumulated by the Broadcast Agent Administrator. Factors and data recorded include:

1. Language(s) for warnings
2. Broadcast Agent Administrator account holder contact details
3. Total number of messages broadcast
4. Total Pops reached
5. Mess-Pops figure (number of messages times the pops reached)
6. Log, (Each broadcast is recorded on the account for later review)
7. Date of contract expiration 8. Networks permitted for this Broadcast Agent Administrator
   9. Channel numbers allowed
   10. Message, Footprint and Broadcast libraries
   11. Jurisdictional limits
   12. Pop limits
   13. Message length limits
   14. Language for web portal
   15. Report parameters and addresses
   16. Admissions rules and operational events such as denials of service.

In some circumstances a report in the form of an e-mail or web-page may be sent or made available to the Administrative Operator and/or the Broadcast Agent Administrator. Such a report may include a warning that the account credit is about to expire, or the status of an account or activity. Such reports may be defined or requested or provided on a regular or specified interval.

Service may be automatically denied to a Broadcast Agent or Broadcast Agent Administrator who has exceeded his quota.

In other cases, information about account status may be signaled to the Broadcast Agent at log on and when proposing messages. This may cause the Broadcast Agent to think again about conserving his quota if near his limit.

The PLBS-SB 102 may also define a Broadcast Message Jurisdiction that is a geographical area for a particular Broadcast Agent Administrator and associated Broadcast Agents. Broadcast Message Jurisdiction may define any number of factors, data, or services. A first factor is a definition or allocation of geographic territory or areas to be accessed or displayed in map format to the Broadcast Agents of the Broadcast Agent Administrator. Additionally, all or a portion of the Broadcast Message Jurisdiction may be enabled or disabled for defining one or more broadcast message target areas or "Broadcast Target Area/Footprints" in which a public service broadcast message is to be sent. A second factor is the identification and specification of telecommunication local carriers (e.g., the networks 112) that will be included in the public service location broadcast message messages originated by the particular Broadcast Agent Administrator or Broadcast Agent. This may also include defining one or more networks 112, network components (such as Carrier Broadcast Center 114 or network switching centers) or sub-networks to be provided the broadcast messages.

The Broadcast Agent Administrator is capable of setting further restrictions or rules related to its Broadcast Message Jurisdiction and one or more Broadcast Agents under its control or within its Broadcast Message Jurisdiction. For example, it may establish different levels of authority for various personnel within a police department or fire department or allocate sub-areas or sub-jurisdictions based on police or fire department sub-boundaries.

For each Broadcast Agent Administrator, the Broadcast Target Area/Footprint Library is generated and shared among the Broadcast Agents. However in some cases, the Broadcast Agent Administrator may wish to predefine Broadcast Target Area/Footprints on the basis of existing agreements. For example, these may include tornado watch boxes or mandated warning zones, such as around a chemical plant.

In this case, the Broadcast Agent Administrator has the option to allow some Broadcast Agents to access only the Broadcast Target Area/Footprint library, or to be able to use the library and the map tool. Other Broadcast Agents may have the authority to create new Broadcast Target Area/Footprints and store them in the library.

In some cases, the Broadcast Target Area/Footprint area may be complex. An advanced Footprint Library feature enables the Broadcast Agent to predefine areas to be covered, and store them in a library of Broadcast Target Area/Footprints specific to that Broadcast Agent. For example, the flood plain area of a river may be too complex to define with a simple mouse click. The definition of that broadcast target area should be done ahead of time, then recalled quickly when an urgent message is imminent. In another case, a tornado warning box is predefined based on political boundary and may be easier to refer to as such.

This feature may also be required if a particular Broadcast Agent only has authority to cover, for example, major highways or coastal areas such as beaches. These can be pre defined predefined by an Administrative Operator and then locked so that the Broadcast Agent has limited authority as to the Target Broadcast Area.

There is no limit on how many end-users one message can reach and in theory an authorized operator may send the message to everyone in the country at the same time. Since most authority is relatively limited, the account may be established on a per Broadcast Agent basis thereby determining the area to be addressed by one message. An Admission Control feature checks each new message for a pop figure before agreeing to proceed. If the pop figure check fails, the message is declined and the Broadcast Agent receives a message and report with an explanation. To continue, the Broadcast Agent can either set the area to one less ambitious (i.e., fewer pops), or request authorization from another Broadcast Agent with more pop authority. The pop figure may also be used to generate usage statistics that the administration system records for each Broadcast Agent. If a Broadcast Agent has exceeded the agreed limit, the account can be closed and an e-mail sent to the Broadcast Agent Administrator explaining this.

Control of pops is also provided for the local carriers 112 because the spacing of Radio Base Stations decreases with increasing population density. A dense urban area may be covered by more cells than the same corresponding area in a rural environment. From a signaling point of view, more cells are signaled for an area in the city that in the country. Therefore, the relationship between pops and network load should be considered. For example, the number of messages times the population targeted [Mess*Pops] is one possible strategy for determining billing, since pop figures are directly available from the reports generated by account administration.

A Broadcast message may consist of 15 82-character messages linked together. The standard default maximum size of a message may be that used by second generation GSM systems, which is 93 characters, or 82 octets of data. However, in practice each message should be less in order to support multiple language messages and for practical application reasons. The Broadcast Agent Administrator may set limits on the length of an individual message. The Broadcast Agent Administrator may also set a limit on how much in total has been sent by all of the Broadcast Agents within his control. An extended-message button on the advanced message dialogue box provides for setting further message contents as required. For future systems, messages may include multi-media messages such as photographs or maps. In such a case, a multimedia facility dialogue box is utilized.

The Broadcast Agent Administrator may also predefine set messages in the message library, so that some accounts may broadcast only predefined messages. Others may be able to create their own messages and store them in the library. Past messages are also stored in the message library for later recall or repetition. Either from the advanced menu or from an advanced button on the quick message box, the Broadcast Agent can select the advanced message panel. Here the Broadcast Agent has many more options to control messages. For example, a particular message may be used frequently, or the precise wording of a message may have been approved at a higher political level in advance and only this wording broadcast. In such a case, the Broadcast Agent selects from a Message Library of standard messages available to this Broadcast Agent. The system stores past messages and is capable of retrieving them for re-transmission.

The system provides for the ability to repeat a message if the emergency continues for a long time, as the location broadcast message will only last for a limited period and be repeated. In other cases, the broadcast event may be triggered by an automatic machine such as a water level device. If so, the event triggers the predefined message as set up by previous agreements ahead of time between the Broadcast Agent Administrator for that organization and the Administrative Operator who administers the accounts on the PLBS-SB 102 in accordance with guidelines agreed upon by government authorities and local carriers.

A Broadcast Proposal includes both the message and the Broadcast Target Area/Footprint together. In some cases both the Broadcast Target Area/Footprint and the message may be predefined by one group of Broadcast Agents giving other Broadcast Agents only the choice as to when to send the message. The Broadcast library also keeps copies of previously sent messages, and their Broadcast Target Area/Footprints, for fast recall and for internal management within the Broadcast Agent organization.

The system also provides for the broadcasting of public messages that are in several languages. In this case the Broadcast Agent will not be allowed to proceed until messages in the other languages have been compiled. Alternatively, the broadcast message may be sent in each language as each is entered. Otherwise translation servers can be signaled for a best effort translation. The account administration parameters will determine this.

In many cases, end users may be travelers from an area where a different language is the primary language. If so, by keeping separate channels for warnings in each language, the end user may receive a message in his own language. This may also be required in multilingual countries or portions of countries such as along a border. The PLBS Operator or Broadcast Agent Administrator may also be required by government authorities to send messages in more than one language. If so, the Administration system reminds the Broadcast Agent to open up messages for all the required languages. It will then link them together so that when one is recalled, they are all recalled together and treated as if the same message.

The Broadcast Agent may not be able to read and write the message in the other language, for example, he may not read Chinese or Arabic. In this case, he can go to the library of messages, which will automatically match the other language message. However this restricts the message to those not containing any variables.

If the Broadcast Agent decides to recall a message from the network and request that its broadcast cease, the linkage will ensure that all languages are recalled at the same time.

The system also provides for the specification of how long a single broadcast continues to be broadcast. For example, for many situations a 20-minute broadcast may be long enough, after which a new command to send the message again can be initiated. The PLBS system may provide for a default time to be set in the Broadcast Agent account. Additionally, in the advanced menu options, the Broadcast Agent may be enabled to set start and stop times.

In other cases, Carriers or their networks 112 may require that the broadcast message have a start time and stop time specified to the cell 118. The message is held at the cell 118 and transmitted only when the start time arises, then transmission will be at regular intervals until the stop time arises, unless a command is received by the cell 118 to cease the message. As such, the PLBS includes a default start time that is set by the PLBS-SB 102 to be NOW, and the stop time to be 20 minutes. In some situations, the Broadcast Agent may have authority to set up messages for delivery at a predetermined time in advance, or to set the broadcast time for a longer or shorter time. For example, the Broadcast Agent may be planning a highway shutdown, and may pre-program the night's messages accordingly. This frees manpower at the busy command center at the very moment when attention may be needed on the radio and elsewhere.

In the advanced message window, a start and stop time box may appear which is set to the defaults. The Broadcast Agent has the option to change these, but as usual the administration system will check that the Broadcast Agent has authority to do so before proceeding with the message.

Channel codes define the type of message sent, which in turn defines the targeted message end user recipients. The subscriber end user who owns the terminal has to switch on or off the channels at his discretion. The account will define which channel codes are defaults for this Broadcast Agent and which are allowed.

The Broadcast message is preceded by a channel code. End users may be given the option to select the type of messages they want to receive by going through a menu on their phone. Some mobile phones are sold with the default state set to disable the receipt of messages. However, to enable mass distribution of broadcast message, the channel numbers are defined for the various message types.

In any case, the Broadcast Agent may have another special need in mind other than to address the public for warnings. The Broadcast Agent may, for example, want to address only police officers or neighborhood watch volunteers in the area. In other instances, there may be automatic equipment in the area which needs to be commanded to perform in a certain way in some conditions and locations, for example, sirens to sound. If so, a different channel number is defined.

If the Broadcast Agent has the authority, the channel number may be changed. In the simple version, the default is the standard code for public safety messaging. In any case, this code is checked against the Broadcast Agent profile by the Broadcast Agent Administrator before the message is sent to verify the authority of the Broadcast Agent.

In many areas, more than one official language is used. In such regions, people speaking one language, can be regularly crossing borders into countries which in themselves have multiple official languages, with primacy in different order. In other cases, such as the maritime service, information should be on the same code, regardless of which country the ship is near. Therefore, the system provides for the ability to transmit alert messages in all major official languages for a region. The system provides a mechanism to give the networks and governmental authorities flexibility in addressing this requirement.

End users may be required to activate one or more functions of their phone. The end user may be motivated to do that if he knows that he will get messages in his language. If the end user can speak more than one language, he can enable more than one code at his discretion. In addition, if the end user is a tourist or traveling businessman, he will get messages in his own language if that host country transmits them as such. For example, at airports, authorities may decide to transmit in English as well as the official languages, so as to warn passengers regardless if they speak the local language or not. Popular holiday resorts are another example.

Furthermore, there may be politically sensitive positions regarding which language is the first and which the second. In one embodiment, pre-assigning codes according the internationally recognized order specified in ISO 639 may be implemented. The use of 145 codes covers most languages (plus some spare for special cases). However, a network 112 may use the unused codes for another purpose. In any case since there are 1,000 codes available, this loss is a low price to pay in return for a good solution.

There are some cases where internationally agreed codes are required. One case in point is that of the maritime service channel. Many small pleasure craft and small coastal fishing vessels are not fitted with marine radio equipment. However, in many cases one of the occupants of the boat does have a mobile unit in their possession. Certainly most large ships do have a GSM installation. If so, the coastal authorities may decide to relay maritime safety information over a Citizen Band (CB) maritime service channel. If so, coastal shipping could switch on this channel. In that case, the channel number should be the same for every port the ship may visit, requiring an internationally assigned channel. In another example, the United Nations (UN) has the responsibility to care for the security concerns of all international relief workers working for them and any Non-Governmental Organizations (NGOs). If the UN Security Coordinator (UNSECORD) had a standard channel, then this highly mobile but very vulnerable group would be reachable on a geographically specific basis, but without having to change the channel number on their phone each time they change border. These two examples illustrate the benefits of the system 100 for supporting multi-border Broadcast Agents.

One embodiment of a coding scheme consistent with the PLBS is provided in Appendix 1.

FIG. 2 illustrates another exemplary embodiment of the Public Service Message Location Broadcast System 200 along with expanded illustration of the service bureau 102 components and operations. In FIG. 2, the exemplary embodiment of the service bureau 102 illustrates the components and operations of creating and submitting a broadcast request by a Broadcast Agent, receiving authorization by the Service Bureau responsible for authenticating such requests and distributing the authorized message to participating networks 112A, 112B and 112C.

In this exemplary embodiment, the service bureau 102 hosts a web portal 202, such as indicated in FIG. 1 as webpage 106. The web portal 202 provides a man-machine interface to a Broadcast Agent utilizing a Broadcast Agent access device 104 (not shown). As shown, the web portal 202 receives from the Account Data 216 the profile 204 for each message entered for broadcast delivery. This can include any variety of user definable parameters and limits. For instance, as shown the message profile 204 can include a set of user parameters 206, broadcast target area footprint parameters 208, message parameters 210, and/or status parameters 212. The user parameter 206 can include authorizations or limitations related to the Broadcast Agent and/or the Broadcast Agent Access Device 104. The footprint parameters 208 can include one or more geographic areas or locations in which the Broadcast Agent has defined for broad message delivery (broadcast target area) or a selection of a predefined broadcast target area. The message parameters 210 can include limits or specification for each proposed message or on the total number of authorized messages or time limits for delivery of the message. Additionally, this can include a set of one or more predefined messages for selection by the Broadcast Agent. The status 212 can identify or define the status of the Broadcast Agent and/or previously proposed or submitted messages.

The service bureau 102 can also include a logfile 214 for logging access by each Broadcast Agent or by the Broadcast Administrator or Operator. Additionally, as this logfile 214 is held in a storage system or memory associated with the service bureau 102, the message profile 204 can be stored within the logfile 214. All broadcast messages are logged by the PLBS-SB 102 in the logfile 224 and cannot be tampered with by the Broadcast Agent or Administrative Operator. In the case of any dispute over a message, the Broadcast Agent Administrator, the Administrative Operator, and/or a government authority may view the log to establish what has occurred.

The logfile 214 may also be used for off line statistics and account administration. The reporting system may send a copy by e-mail to the Broadcast Agent and/or Broadcast Agent Administrators if required. In some cases, billing can be derived from the message log and an off-line billing gateway program that would use agreed information to derive billing.

An account data 216 can also provide stored information related to one or more accounts or Broadcast Agents utilizing or accessing the service bureau 102. Additionally, a gatekeeper management module 218 can provide for the management of access and system utilization by coordinating between the logfile 214 and the account data 216.

An admission control 220 provides for security and management of each Broadcast Agent accessing the web portal 202 or other functions and systems of the service bureau 102. The admission control 220 receives the message profile 204 received by the web portal 202 and receives input from the account data 216. Admission control 220 receives the message request that contains the proposed message as well as the broadcast target area. A report subsystem 222 generates reports for administration and operator review. Such reports can be stored and/or logged in the logfile 214.

A distributor 224 receives the broadcast message request and maps the Broadcast Agent's broadcast target area to determine which broadcast distribution networks 112 or network service providers have networks providing broadcast distribution systems serving the broadcast target area. Once the distributor 224 has identified the broadcast distribution networks for the broadcast target area, it determines whether the broadcast distribution network 112 has its own cell broadcast center 114 and an associated service bureau 102 (identified as CBE) to cell broadcast center 114 (CBC) interface.

As shown in FIG. 2, each network 112 having broadcast capable networks serving at least a portion of the broadcast target area receives the broadcast message and its associated parameters at its cell broadcast center 114. The cell broadcast center 114 also receives the coordinates for the broadcast target area in which the message is to be delivered. The cell broadcast center 114 identifies the network elements within its serving network associated with the broadcast target area and transmits the broadcast message to those network elements for appropriate transmission. In FIG. 2, the cell broadcast center 114A of network A 112A communicates the message to the network addresses to a broadcast switching center (or system) 116A1 and 116A2 for delivery and transmission over broadcast facilities 230A1 and 230A2, such as towers or antennas on a tower, by way of example. Similarly, a second network 112B may also provide service to some or all of the broadcast target area and also have broadcast facilities 230B1 and 230B2 that are addressed by network B's broadcast switching center 116B1 and 116B2. The broadcast switching center 116 can be any network element configured to support delivery and/or transmission of the broadcast message to a geographic or location specific user delivery device or broadcast facility 230. The broadcast facility 230 can be an antenna, a satellite, a fiber cable, a wireline system, or other network element capable of delivering the broadcast message to end users within the designated broadcast target area.

In operation, the Broadcast Agent utilizes the web portal 202 to define the broadcast target area. The service bureau 102 receives the message profile 204 entered by the Broadcast Agent and cleared or authorized by the admission control module 220. The distributor 224 identifies the networks providing service to the broadcast target area for the requested message. The distributor 224 sends the broadcast message along with a coordinate-defined broadcast target area over the CBE-CBC interface 226 to the appropriate cell broadcast centers 114. The cell broadcast center 114 determines the network elements providing service to the defined broadcast target area and identifies the network addresses thereof. The cell broadcast center 114 transmits the broadcast message within the network 112 over a local facility to a broadcast switching center 116.

In one alternative exemplary embodiment, the network service provider for the particular network 112 may have designated the service bureau 102 to provide the required broadcast message network routing for delivery of the broadcast message within the network service provider's network 112. As shown in FIG. 2, the network 112C includes a remote selector 228 rather than a cell broadcast center 114. In this case, the service bureau 102 maps the broadcast target area into network addresses for direct network addressing of the broadcast messages for network routing through the remote selectors 228 and to ultimately be delivered to end users within the broadcast target area served by the network provider 112C. The remote selector 228 receives the network addressed broadcast message and delivers the message using the network addresses to the associated broadcast facility (not shown) in the network 112C that serves the broadcast target area.

The Broadcast Agent requires the permission of the local carrier to use their network for this purpose. The administration of individual accounts is provided to the Administrative Operator to define network guidelines for each Broadcast Agent Administrator. For each Broadcast Agent Administrator, the carriers that have agreed to carry his traffic are signaled individually. Each Broadcast Agent Administrator is provided with the ability to customize the interface between the various networks 230A, 230B and 230C to match the protocols or business requirements of the carriers.

The message is transmitted to the carrier for broadcast transmission over their network. In most cases, the message is transmitted to every known operator offering coverage of the area and may include mobile carriers, digital private radio systems operators, private radio system operators, internet service providers, wireline telecommunication service providers, satellite service providers, CATV operators, etc.

The PLBS-SB 102 sends a copy of the message and geographical information about the required Broadcast Target Area/Footprint to each operator's network center 112A, 112B and 112C for further processing by the Carrier Broadcast Center (CBC) to determine which cells are involved, then send the signals to the correct switching center or Gateway platform. Some messages may be intended only for the private digital radio system used by the organization such as a police radio network. In other cases, sending a multimedia message such as a map or photo to a text-capable second generation 2G networks may not be applicable.

Carriers or telecommunications operators may decline to accept messages from a message source, or of a particular subject matter, context, or content. In each case, the networks which have been selected may be checked by a Gatekeeper Administration Subsystem 218 or Administrative Entity before the message is transmitted.

In some cases the Broadcast Agent may decide to recall the message before it has elapsed its time. In this case, the Broadcast Agent will select the message from the message library and click or press the recall button. Administration sends the recall command to the concerned networks or carriers.

Emergency situations are very dynamic, and the situation may change shortly after sending the message and before the expiration of the message time. If so, the PLBS 100 provides the Broadcast Agent with the ability to recall the message. The system 100 also includes a recall button to recall the message as displayed in the window. Each message is given a daily number for fast recall purposes.

The Broadcast Agent may wish to confirm that the broadcast has indeed been passed to the networks for broadcasting. This confirmation can be by an e-mail or a report box on the browser from the report subsystem 222 or other administration reporter. Additionally, the reporter subsystem 222 can transmit copies to other connected systems or monitoring centers (not shown).

Since the actual broadcast is managed by each participating local carrier through the carrier's network of gateways and switches, the PLBS-SB 102 does not have any further influence on the process after the message/target broadcast information has been sent to the participating carriers cell broadcast center 114. Therefore, any message broadcast progress information passed back is only valid up to the moment of information handoff to each participating carrier.

The report system 222 can send a pop-up window back to the Broadcast Agent provided he has not logged off the system 100. This report can show ticks indicating that the message was handed off to the participating networks 112. However, it does not indicate that the message is actually being transmitted in real-time. Optionally the report system 222 can send an e-mail to the Broadcast Agent Administrator to inform him that messages have been sent. Should any irregularities occur or other trigger events, such as the near exhaustion of agreed messages, then a report can be sent to the Broadcast Agent Administrator's e-mail address reporting this.

Reports may be automatically generated as plain text messages and sent to an electronic address or e-mail account defined by the Broadcast Agent Administrator and/or Administrative Operator.

The Web Portal 202, as hosted directly or indirectly by the PLBS Service Bureau 102, communicates with a Web Browser 106 at the Broadcast Agent's location, as discussed below. The objective of the Web Portal 202 is the creation of a Broadcast Request, a file which holds the following information.

a. Broadcast Target Area/Footprint
   b. Broadcast Message and related parameters
   c. User Parameters (e.g., Broadcast Agent User ID and Password)
   d. Status of the Broadcast Request, (times Proposed, Authenticated, Handed off) and status reports.

The Admission Control Subsystem 220 ensures that the proposed Broadcast Request by the particular Broadcast Agent at this time is authentic before passing it to the participating networks 112A, 112B, and 112C.

For the Broadcast Agent and session, the Web Portal 202 provides an environment for the Broadcast Agent consisting of the maps of his jurisdiction, the Broadcast Target Area/Footprint, message and broadcast libraries that apply. The Web Portal 202 gets this information from the Account data 216. When the Multi-Language feature is required, appropriate windows are provided in the message window.

The Broadcast Agent Web Portal 202 creates a Broadcast Request record with the name, the current system date and time from when the Create Message button was pressed.

When the Broadcast Agent clicks the GO-button, the Admission Control Subsystem 220 fetches a Broadcast Agent profile from the account database 226. It checks all the parameters of the Broadcast Agent and message to determine if the message will be admitted or declined.

When a message is declined, the Broadcast Record is marked as such by its status register 212 and sent to reporting; a report is then generated and e-mailed as per the parameters in the account data. The Broadcast Record is then stored along with the reports in the broadcast log 214. The Broadcast Agent creates a new broadcast that has a new number.

The Broadcast Agent ID and password details are checked against the profile to authenticate the Broadcast Agent. If not authentic, the message is declined. Admission Control 220 will then check the Broadcast Target Area/Footprint against the profile. If not within the Jurisdiction the message will be declined. Admission Control 220 then calculates the Pops figure for this message by multiplying the area derived from the Broadcast Target Area/Footprint, by the population density. Population density figure data is fetched from Account Data 216. The [total messages], [Pop density], and [total mess*pop] figure is then fetched from the Account Data 216, and the new figure is added in the broadcast record but not written into the account data. The total result is checked against the limits set in account data. If the limit is exceeded, then the admission rules are checked to see if the broadcast may be sent. If not, the message is declined. Alternatively, a report may be generated according to the admission rules.

Multi-language messaging checks may be performed to see if the Broadcast Agent has defined a message for each language as required by the government authorities. If not then the Broadcast may or may not be declined according to admission control rules.

The networks requested are checked against the Account Data 216. The Web Portal 202 may have participating networks 112 that the Account Data 216 has defined, however in some cases some networks may accept some channels while others do not. If so, the broadcast may continue on the allowed networks and declined on others, or it may be declined altogether.

If Admission Control 220 is satisfied that the Broadcast Request is valid, then it is sent to the Distributor 224.

The Admission Control 220 ensures that that any Broadcast Request meets with the approval based on preset guidelines. The parameters as to what is acceptable and what is not are set by the Administrative Operator in the Administration Data Base Account Data 216. Each registered Broadcast Agent, that is everyone who is allowed to create Broadcasts, has a separate Profile recorded in the Administration Database. Only the Administrative Operator has access to this file and can create, edit and delete Broadcast Agents. All Broadcast Agents belong to a Broadcast Agent Administrator, and may not have authority exceeding their Broadcast Agent Administrator.

The parameters used in the Administration Data Base are reviewed in the PLBS-SB 102 System description document. There are other parameters about the User ID, the Broadcast Agent Administrator to whom the Broadcast Agent reports, and the current password and authentication key for each Broadcast Agent that may also be included.

The Administration Subsystem is responsible for creating an object called the Broadcast Request. This file details everything known about each proposal. It also contains a check list of flags that are used by the system to track the progress of each Broadcast Request. A Broadcast Request is known by a unique ID consisting of the PLBS-SB 102 that accepted the proposal, and the date time group identifying when it was accepted as a valid proposal.

When the Broadcast Agent clicks the "propose" or "GO" button, the Gatekeeper Administration Subsystem will check that the Broadcast Request has been created with enough required information, and is formatted correctly. When the Proposal is correctly formatted, it is recorded in the logfile 214 data base, in an area where pending proposals are kept. The Administration Subsystem then orders the Admission Control 220 system to run.

Once Admission Control 220 has authenticated and approved the transmission of the Broadcast Request, the message and broadcast target area information is submitted to the Distributor 224 for transmission to Participating Networks 112 for message distribution. If the carrier has provided its facility, network addresses or location coverage area data to the PLBS-SB 102, the Distributor 224 converts the target area map parameters entered by the Broadcast Agent into a network addresses and transmits the message parameters and associated network addresses to the carrier via the carrier's Carrier Broadcast Center 114.

For carriers that elect not to provide the PLSB-SB 102 the details of the networks including the network facility addresses, the Distributor 224 transmits the message and the target broadcast area coordinates of the target broadcast area to the carrier. The carrier performs the required conversions of target broadcast area to network or location addresses, such as cell site identifiers.

The network facility selector function managed by the Distributor 224 can be supported via predefined network facility service pools, e.g., so that predefined message target broadcast areas and their associated network facility identifiers can be expeditiously processed by each carrier.

Figure 3:
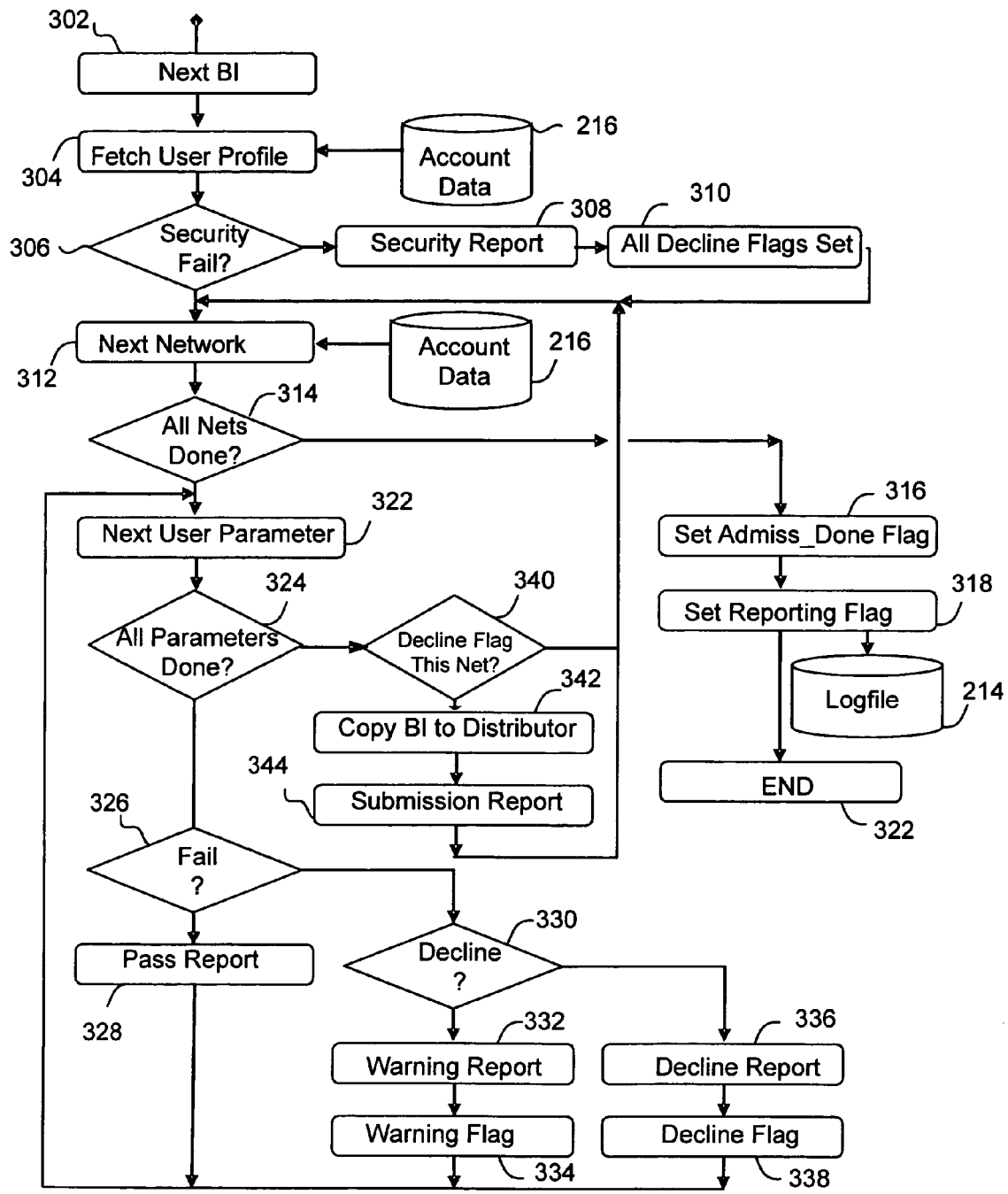
FIG. 3 is a flow chart for an admission control process within the public service message location broadcast system service bureau according to one embodiment.

Referring to FIG. 3, the illustrated admission control method 300 (also referred to as the Haslemere algorithm) uses the convention of having a yes answer coming out of the side, and a no answer from the bottom is applicable unless otherwise indicated.

The method 300 starts at a Next Broadcast Agent 302 process that provides that when activated, the Admission Control (AC) 220 (admission) fetches the next Broadcast Agent from the logfile 214 where pending Broadcast Messages are waiting. The AC also copies all the parameters.

Next a Fetch User Profile 304 process provides that the User ID is read and the Broadcast Agent profile is fetched from the Administration Data Base such as Account Data 216.

The next process is a Security Fail 306 process that provides that the User ID is checked against the password and authentication key entered in the database. (The Administration Control system has validated the data link and network address of the originating terminal in the case of secure tunneling or Virtual Private Network or VPN access).

A Security Report 308 process provides that if the security check fails in 306, a short message explaining the reason for the failure is generated. The short message is appended to the report field for this Broadcast Request. In the case of a security offense or alert, additional data may be included such as details related to the attempted action.

In an All Decline Flags Set 310 process, to avoid a transmission of this Broadcast Agent, a Decline Flag is set for a Broadcast Request on all the network fields to restrict transmission.

A Next Network 312 process provides that if there is no security problem, the Broadcast Request is examined to see which is the first network to be attempted. The Admission Parameters for this network will now be queried from the Administration Data Base or from the Account Data 216 and examined. When this is performed for all networks, a copy of the Broadcast Request is sent to the distributor 224, which converts the Broadcast Request into a signal for sending to the Carrier Broadcast Center 114 at the network management center of a network 112. A communication protocol is used that may be a standard protocol or an application specific protocol such as a Broadcast Message Submission Protocol (BMSP).

In an All Nets Done 314 process, an end of file marker is checked and read to determine whether all required networks have been analyzed. When all networks have been signaled, the Set Admiss Done Flag process 316 sets the flag to complete or notification is set on the Broadcast Request record along with a timestamp indicating completion of the administration process. A copy is transmitted to the Broadcast Agent Access Device 104. Also a Copy To Reporting process 318 or set reporting flag provides that a copy of all Broadcasts and Broadcast Requests are written to or stored to the Broadcast Request reporting field that is sent to the reporting subsystem for transmission to the Broadcast Agent Administrator and to the Carrier Broadcast Centers or their reporting subsystem. Also a Copy to Logfile process (not shown) can provide that the Broadcast Request is stored in the Logfile 214 and deleted from the pending area. At this time, as all networks have been signaled with the intended message, the location message broadcasting method 300 is complete.

If all networks have not been signaled, the process continues to a Next Broadcast Agent Parameter 322 process (labeled as Next User Parameter) that provides for retrieving the Next Broadcast Agent parameter from the Administration Data Base and comparing it to the requesting Broadcast Agent. An All Parameters Done 324 process ensures that all parameters have been evaluated and the file processing is near completion. If all parameters are not done in process 324 (e.g., results in a NO), then a Fail? 326 process determines if a parameter in the Broadcast Request does not meet predefined criteria for a Broadcast Message as defined by the PLBS 100 and/or of the Broadcast Agent Administrator. If the Fail? 326 process is negative, then the method 300 continues to a Pass Report 328 process. In the Pass Report 328 process, if the parameter is within the predefined criteria, the reporting system appends to the Broadcast Request report a short message indicating which parameter has been passed. This provides for trouble shooting and resolving disputes. After this, the method 300 returns to the Next Broadcast Agent Parameter 322 process.

However, if the Fail? 326 process results in a yes, then the method continues with a Decline? 330 process. The Decline? 330 process provides that if the parameter under test does not fall within the predefined criteria, the parameter fails and special handing procedures are applied. Such procedures may enable a system override or an operator override such that the Broadcast Request may continue even in light of the parameter within the predefined criteria. Such procedure may include checking the Decline parameter. If the Decline? 330 process results in a NO, than a Warning Report 332 process (if the Decline Parameter is not met), generates a warning message and appends it to the Broadcast Request. Next a Warning Flag 334 process sets a warning flag against the particular network. The method 400 then loops back to the Next Broadcast Agent Parameter 322 process. However, if the Decline? 330 process results in a yes (e.g., if the Decline parameter indicates that the Broadcast Request is declined), then a Decline Report 326 process generates and appends a decline report to the Broadcast Request. A Decline Flag 338 process sets a decline flag against that network upon indication of a Decline Parameter. A decline flag may apply to one or more networks as a function of the network facilities or arrangements. After the Decline Flag 338 process, the method 300 returns to the Next Broadcast Agent Parameter 322 process for further processing.

Referring again to the All Parameters Done 324 process, if the All Parameters Done 324 process results in a yes, indicating that all parameters have been processed, a Decline Flag this Network 340 process is initiated. The Decline this Network 340 process provides that when all the parameters have been evaluated, the All Parameters Done message is returned. Prior to sending a Broadcast Request to the Distributor 224 for sending to the participating Carrier and Carrier's network 112 or Carrier Broadcast Center (CBC) 114, a determination of whether the Broadcast Request or message has been declined by the entity or system is determined. If the Decline Flag This Net process 340 results in a yes, the process returns to the Next Network 312 process so that the next network is evaluated since each network will have network-specific criteria and parameters.

However, if the broadcast message has not been declined for the particular network, then the message is passed on to a Copy to Broadcast Request Distributor 342 process. In process 342 a copy of all or the relevant parts of the Broadcast Request is sent to the Broadcast Distributor 224 or placed in a queue. The Broadcast Distributor 224 may reformat the data according to one or more predefined parameters, formats or protocol associated with the transmission facility or link for communicating to the Carrier or the Carrier Broadcast Center (CBC) 114. Next a Submission Report 344 process provides for a submission date and timestamp to be appended to the report, and stored by the PLBS 100 and/or Broadcast Agent Access Device 104. The process returns to the Next Network 312 process so that the next network is evaluated since each network will have network-specific criteria and parameters.

In practice, a Broadcast Agent using the Broadcast Agent Access Device such as the Broadcast Agent Access Device 104, defines the broadcast target area by drawing shapes or indicating areas on a map to where the broadcast message should be sent. As the broadcast target area will likely be served by two or more carriers or telecommunications service providers, the PLBS 100 determines which carriers serve all or a portion of the broadcast target area. The PLBS 100 may perform this function by a Broadcast Distributor 224 which may be an integral system or module or a separate standalone system or module. It may be implemented in hardware or software. The Broadcast Distributor 224 routes the broadcast message to the Carrier Broadcast Center (CBC) 114 of the carriers providing service to all or a part of the broadcast target area as defined in the Broadcast Request. This may be implemented in any possible arrangement including a table, chart, or map.

Operators may in turn have different vendor implementations for a Carrier Broadcast Center (CBC) 114, for example, the GMG 1.5, CellTech, or the Logica 1100, so a different mode of signaling for each type may be provided. One known industry standard protocol is Broadcast Message Submission Protocol (BMSP). Administration data includes routing or address information for the appropriate Carrier Broadcast Center (CBC) 114 interface unit, so that the appropriate signaling protocol conversion occurs.

Signaling to the CBC 114 may utilize an industry standard BMSP protocol that defines the area polygons in WGS84 co-ordinates, the message, and associated scheduling information. The CBC 114 provides a check of the proposed broadcast message for validity and converts the defined broadcast target area that may be defined by map polygons into a Cell Identification (CellID) list. In one embodiment, the CBC 114 sends the CellID list to the broadcast switching centers (BSC) 116 by standard communication protocol such as the GSM 03.49 protocol/list. Transmission between PLBS-SB 102 and CBC 114 may utilize commercially available systems and facilities that may include TCP/IP secure tunneling protocols, or X.25 as specified by the local carrier.

When a PLBS Location Selector is provided at the carriers or local carrier's location, the Broadcast Request file may be transmitted by FTP/TCP/IP to the Location Selector for local processing into a Cell ID list before sending to the CBC 114 or the BSC 116.

The Administrative Operator utilizes the system 100 to designate administrative and operating parameters and profiles, authorizations, and restrictions for each Broadcast Agent Administrator. These may be based on government regulations, negotiated agreements, standards or policies and practices. This may include establishing schedule of authorizations for various Broadcast Agent Administrators and/or Broadcast Agents.

The Administrative Operator also establishes within the system an Administration Database to set account parameters so that Broadcast Agent Administrators and their Broadcast Agents have defined authorization levels. The Administrative Operator also uses the system to establish and maintain an account for each Broadcast Agent and Broadcast Agent Administrator for billing and administration purposes.

The system is configured to enable the Administrative Operator to resolve review Logfiles 214 and Broadcast Requests. The system enables the Administrative Operator to read the logfiles 214, and to read and write to the Administration Data Base. The Administrative Operator Management Subsystem is configured to provide the Administrative Operator with a web control panel or GUI environment in which to administer the User account data and system. The system is configured to generate statistics for administration, management, reporting, and billing.

A Location Broadcast Reporter 110 may be configured to store broadcast messaging data and to prepare and produce reports related to past, pending, and future broadcast messages in one or more areas. The Location Broadcast Reporter 110 may be located at a disaster management office, a control room, or the PLBS-SB 102. However, if the Decline Report 336 process finds that the Decline parameter indicates that the Broadcast Request is declined, access to such reports and data is only made available to authorized personnel of the PLBS operator or an administrative or government entity. Such reports may be made in real-time via a web-based interface such that immediate action may be taken or additional or related actions may be initiated.

When the Admission Control Subsystem 220 does not accept the Proposed Broadcast Request, a status message may be sent to the Broadcast Agent Access Device and a Report Required flag may be set. The profile is obtained from the account data to determine the appropriate procedure.

Additionally, a notice or dialogue box may be opened at the Broadcast Agent Access Device to report the situation to the Broadcast Agent. If the Broadcast Agent has logged off the Broadcast Agent Access Device, a notification such as an email report is sent to the Broadcast Agent Administrator and the Broadcast Agent according to predefined addresses and arrangements. A copy of the report is also appended to the Broadcast Request to provide a record of the action.

Reporting also provides for reporting of any activity on the account to the Administrative Operator and Broadcast Agent Administrator. This includes reporting of any warnings that the account may expire. Reporting also sends account information to the Broadcast Agent Administrator on a regular basis depending on parameters defined in the account data. Reports are stored in the logfile which may be accessed by the Broadcast Administrative Operator.

A Broadcast Agent Access Device or Terminal 104 accessing the Broadcast Agent Portal 202 or Webpage 106 may be located at a Disaster Management Office such as a police control room. The authorized Broadcast Agent creates and proposes the message using a web or internet browser, with web access, public service message location broadcasting system Direct, or the Public Service Location Broadcast Controller (PLBC).

The Broadcast Agent interacts with the PLBS-SB 102 over a web page 106, (via a Web Portal 202) and loading of special client software is usually unnecessary. Almost any computer can use PLBS-SB 102 without any modification.

The Broadcast Agent accesses the Public Service Location Broadcast System (PLBS) 100 via a communication network including the Internet and/or the World Wide Web. The Broadcast Agent device may be any communication device and is preferably one that is configured to access the Internet and/or to host a webpage. This includes a personal computer, laptop computer, mobile phone, and personal administrative device and variations thereof.

The Broadcast Agent device can access a webpage 106 or portal 202 hosted directly or indirectly by the public service message location broadcasting system. Any current or future web, internet, or similar future services browser or access method may be used by the Broadcast Agent. A standard language, such as in one embodiment a Hyper Text Mark-up Language, HTML, may be utilized using any existing or future hardware and/or software platform. Standard, proprietary, and/or commercially available communications systems and protocols may be utilized to provide the various communications facilities and interconnections.

When added security is desired, commercially available or proprietary effective security protocols and measures such as Secure Socket Layer (SSL) with public key encryption may be employed along with private networking facilities, Virtual Private Network (VPN) facilities, and/or secure tunneling features.

A Broadcast Agent Web Portal 202 is made available throughout a LAN or an Internet to provide each and every Broadcast Agent with the flexibility of accessing the Public Service Message Location Broadcast System (PLBS) 100 via any workstation wherever it may be located, including ones located at a home, remote office, or a portable computer, device or platform. The system may utilize wireless LANs such as the 802.11 technology and mobile Internet systems and networks.

The Broadcast Agent Web Portal 202 is presented as a Web Page 106. The Broadcast Agent Webpage 106 may be displayed in a design configuration or pattern with an appearance of a control room or panel. Additionally, the Broadcast Agent Webpage 106 may include a Geographical Information System (GIS) service portal or webpage.

The Broadcast Agent Web Portal 202 or Webpage 106 may include or be composed of one or more maps with scroll bars and zoom options for easy and quick map viewing. One or more tool bars provide the Broadcast Agent with the ability to select and define a broadcast target area in a map format. While current web browsers do not process Geographical Information System (GIS) data, the map may be a Joint Photographic Expert Group (JPEG) format image or file with conversions for position being performed by the PLBS-SB to aid the browser. However, it is expected that in the future the Broadcast Agent Web Portal 202 or Web Page 106 will directly support GIS map data, displaying such information, and definitional inputs.

Figure 4:
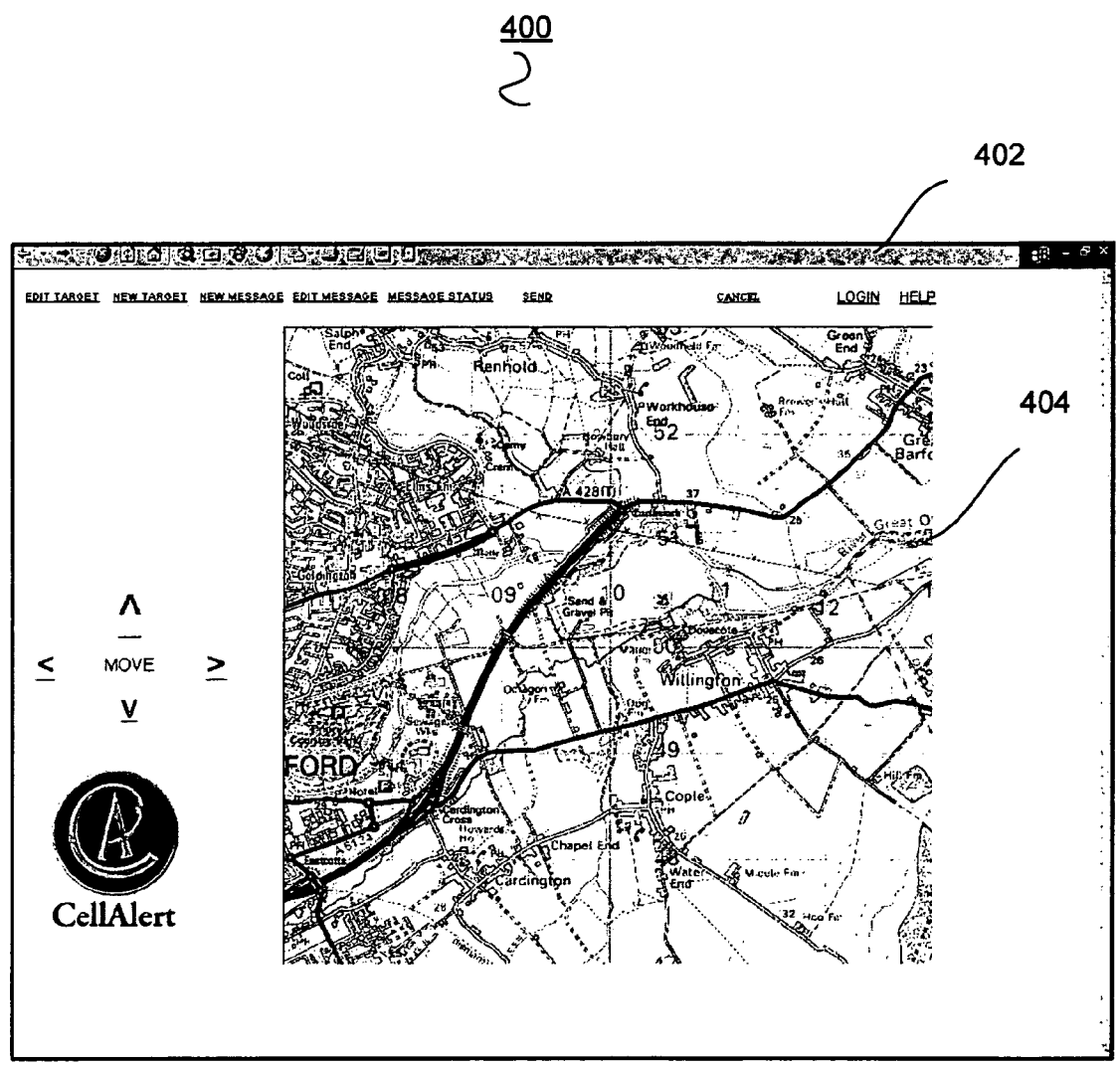
FIG. 4 is a screen shot of the Broadcast Agent Portal Webpage.

Referring to FIG. 4, a graphical user interface (GUI) 400, or similar user interface, can be provided by the Web Portal 202, the Web Page 106, local software or similar mechanism, including the Advanced Broadcast Commander 108. The user will have first entered his userID and password before access is allowed. The system 100 can display a map to the Broadcast Agent as a function of the user ID and his authorized jurisdiction. A Home Page 402 of the Broadcast Agent Web Page 106 may present a map 404 of the demonstration zone and a city or location name associated with the particular geographic area and/or the particular Broadcast Agent. The GUI interface 400 to the Broadcast Agent can be provided by either the Web Portal 202 or the Advanced Broadcast Controller 108. In an alternative embodiment, the Home Page 106 may display general data available to all users.

When a Broadcast Agent logs in to the PLBS System 100, a map 404 of the jurisdiction of that Broadcast Agent is displayed. The map 404 is established by the Administrative Operator and/or the Broadcast Agent Administrator to prevent accidentally sending messages to an unrelated or unauthorized area. As shown, the displayed map 404 includes geographic areas in which the Broadcast Agent can specify or define a target broadcast area. This map can include streets, municipal boundaries, and/or points of interest, by way of example.

The Broadcast Agent Web Portal 202 or Web Page 106 are designed to enable the sending or requesting of a Broadcast Request or message within six "Enters" or "clicks" from the Broadcast Agent accessing the Web Portal 202. Similarly, the system is designed so that such actions are timely and may be accomplished in 15 seconds.

Figure 5:
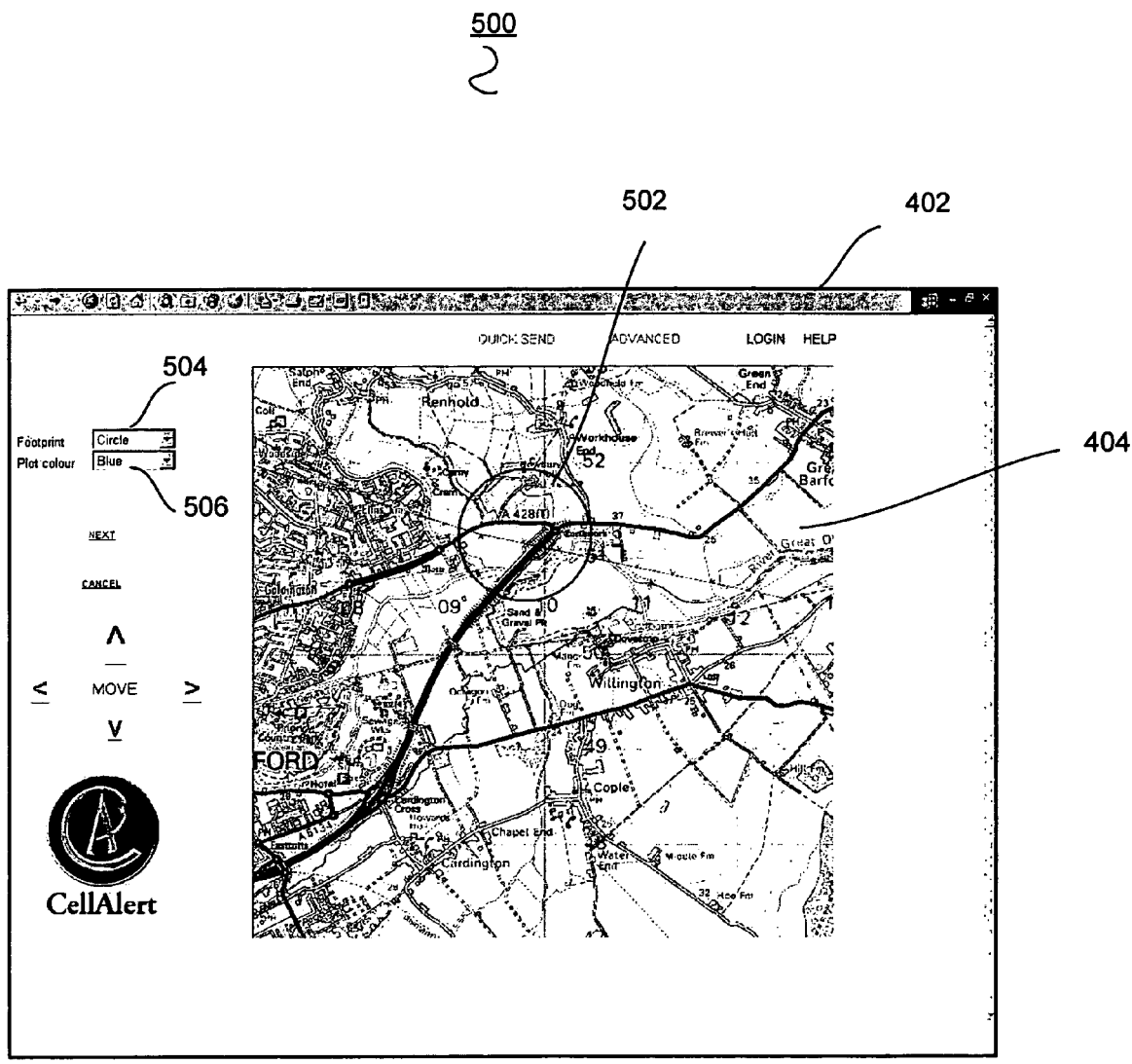
FIG. 5 is a screen shot of the Broadcast Agent Portal Webpage illustrating a Broadcast Agents initial designation of a target broadcast area.

Referring to the displayed user interface 500 of FIG. 5, the Broadcast Agent utilizing the Broadcast Agent Web Page 106 uses a pointing device such as a mouse or touchpad to define an area for which the message will be broadcast, e.g., the broadcast target area 502 or Footprint. Preferably, the broadcast target area 502 is defined by the Broadcast Agent through a graphical selection means such as clicking a mouse on the displayed map 404. For example, when displayed the interface 500, the user may use the move buttons to scroll the map 404, and select a scale. He then can use a Draw tool to point and click a mouse to create an area know as the 'Footprint,' such as the target broadcast area 502. In this example, a mapping footprint is selected to be a circle 504 and to be visually indicated by the color blue 506 as selected by the Broadcast Agent.

Figure 6:
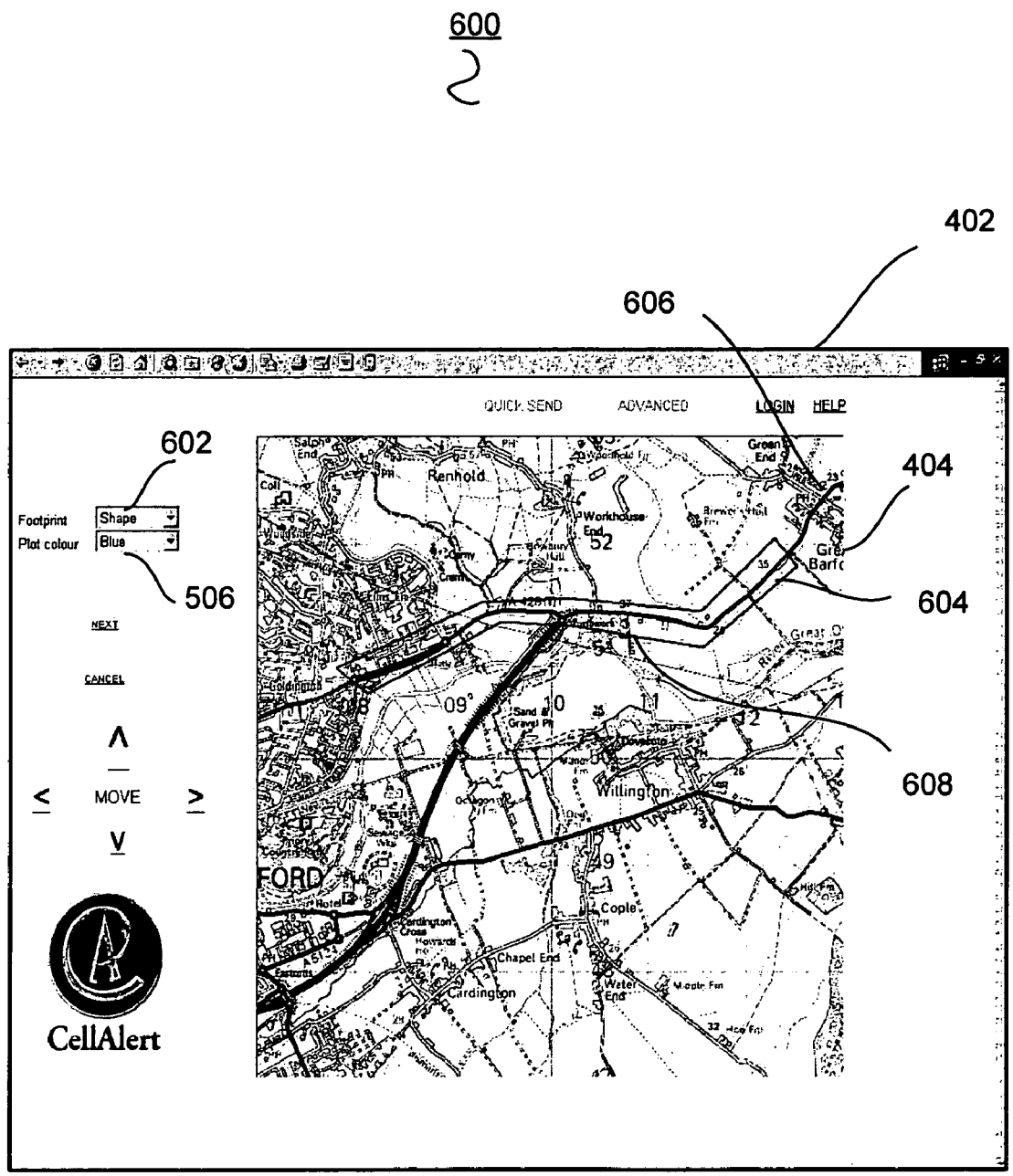
FIG. 6 is a screen shot of the Broadcast Agent Portal Webpage illustrating use of a shape tool to define the designation of a target broadcast area.

Additionally, as shown in the displayed user interface 600 in FIG. 6, the Broadcast Agent can utilize the GUI interface and use a shape tool to define the irregular-shaped target broadcast area. In this example, the shape tool 602 selected with the color blue 506 and the Broadcast Agent has defined on map 404 an irregular polygon 604 that surrounds a section of highway 606 that may be the focus of a traffic alert. Such irregular target broadcast area 608 can be defined and saved into a footprint library for later recall.

Figure 7:
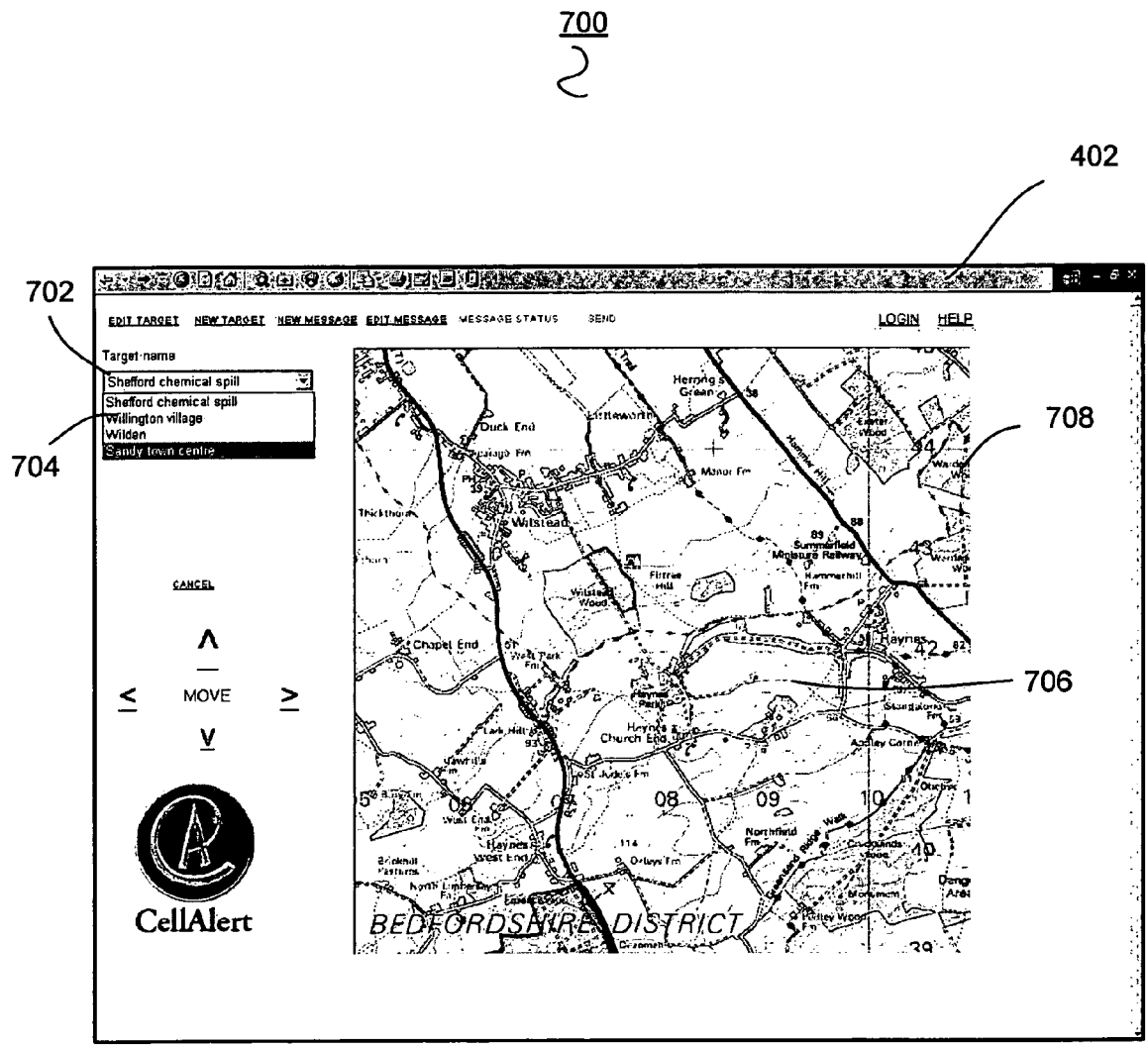
FIG. 7 is a screen shot of the Broadcast Agent Portal Webpage illustrating a library of footprints for predefined target broadcast areas.

FIG. 7 illustrates an embodiment of the displayed user interface 700 illustrating selection of a target broadcast area from a library 702 of predefined footprints 704 from which a target broadcast area 706 may be selected on a map 708. One such application may include a library 702 having various flood zone areas 704 that can be selected to broadcast a warning message to recipients in the area in the case of a flood or similar emergency.

Figure 8:
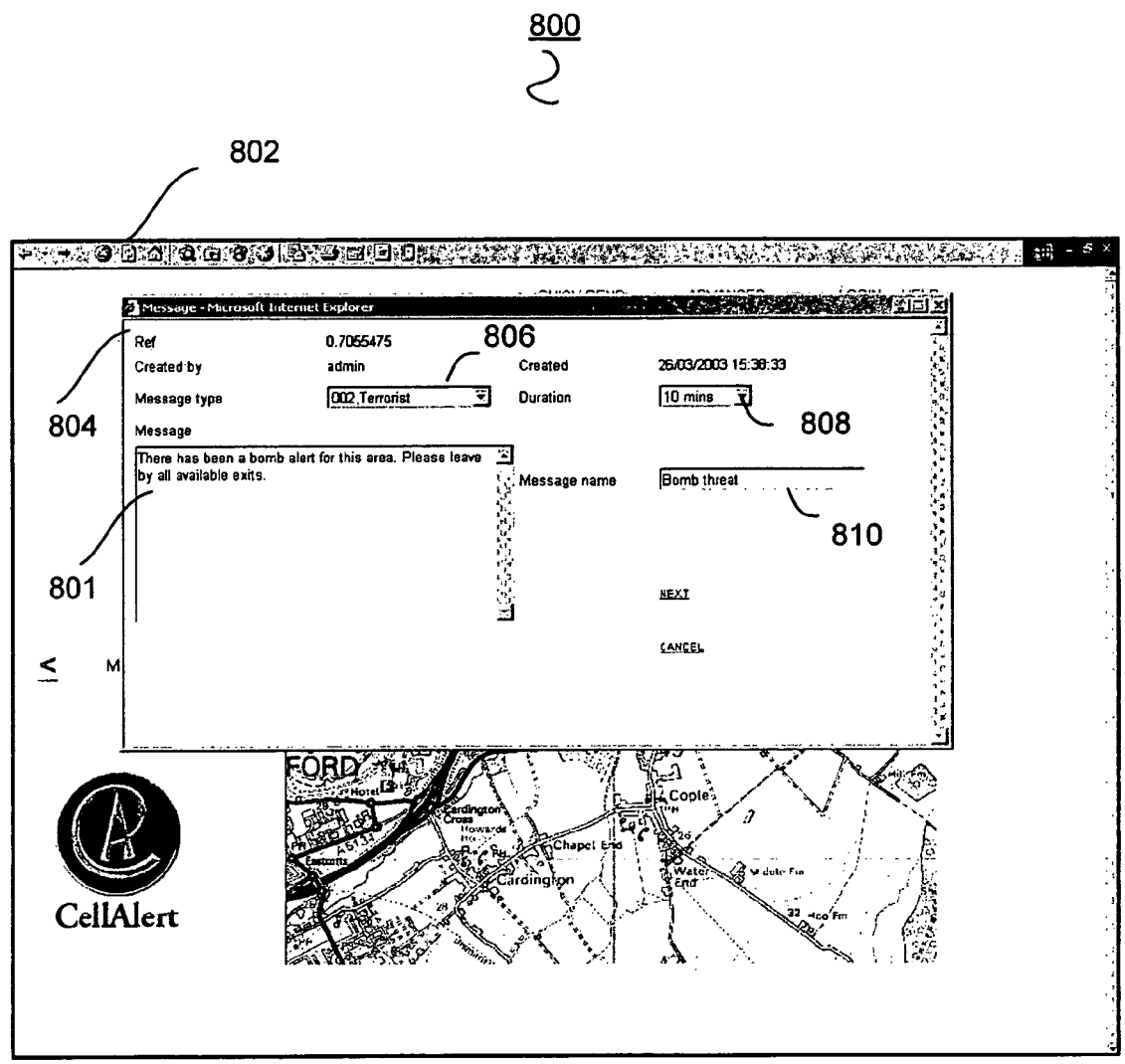
FIG. 8 is a screen shot of the Broadcast Agent Portal Webpage illustrating a dialogue box enabling the Broadcast Agent to create a message and parameters of the Broadcast Request.

As shown in the display image 800 of FIG. 8, after the Broadcast Agent defines the broadcast target area, the Broadcast Agent initiates a message menu button on the menu bar 802 and enters a message 801 such as by typing a text message into a keyboard. The message entry display screen or window 804 can allow for the identification of the message type 806, the duration of the message 808, and an entry of a message name 810. In some embodiments, once the target broadcast area is defined, a dialogue box opens showing options available to the Broadcast Agent. These are typically defined by an administrator, operator, and/or under contract. The Broadcast Agent can then enter the text of the message 801, its channel number (or this may be fixed), and the duration of the broadcast 808.

Figure 9:
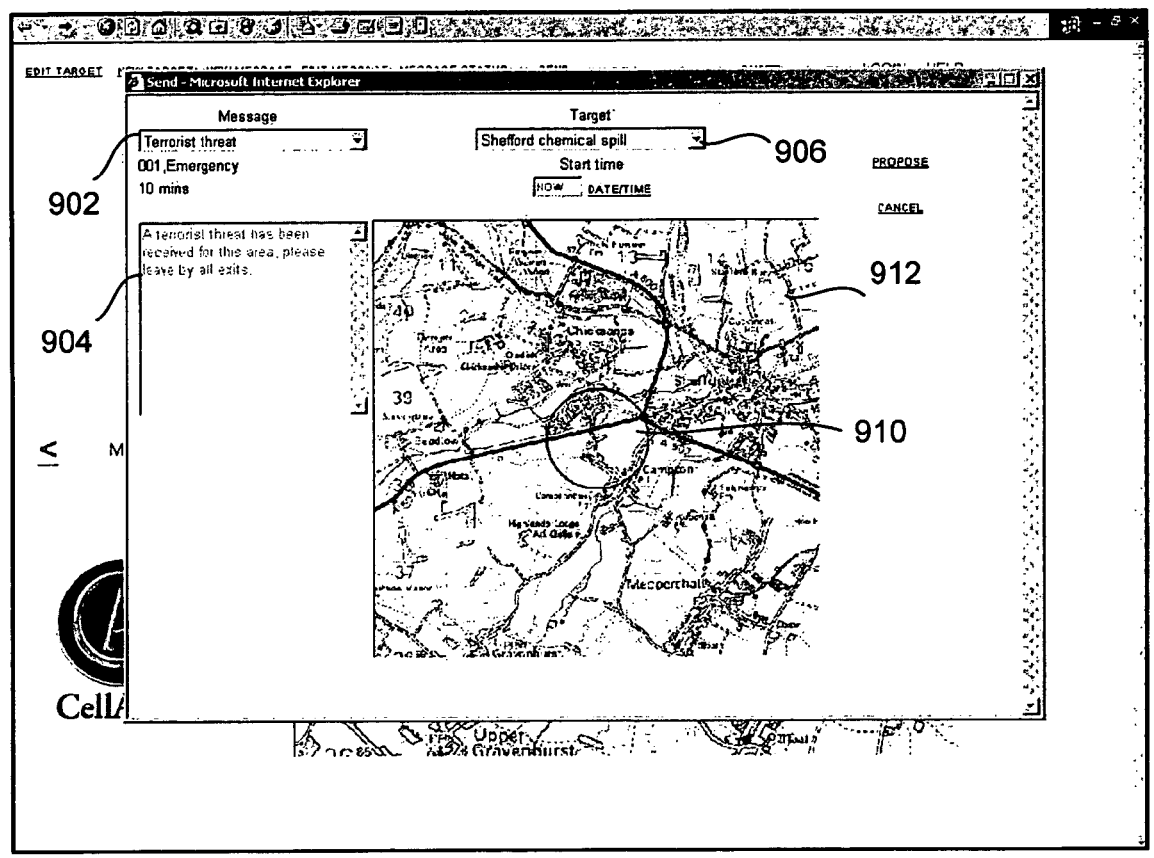
FIG. 9 a screen shot of the Broadcast Agent Portal Webpage illustrating a library of target broadcast areas and a library of messages.

In some embodiments as shown in display image 900 of FIG. 9, in some applications a standard library message 902 can be selected from a list of predefined messages, and include the predetermined message 904 and possibly a predetermined target broadcast area 906. Each of these may be recalled in order to expedite the submission of a message broadcast request by a lower authorized Broadcast Agent. As shown in display image 900, the shefford chemical spill 910 is identified on map 912.

Figure 10:
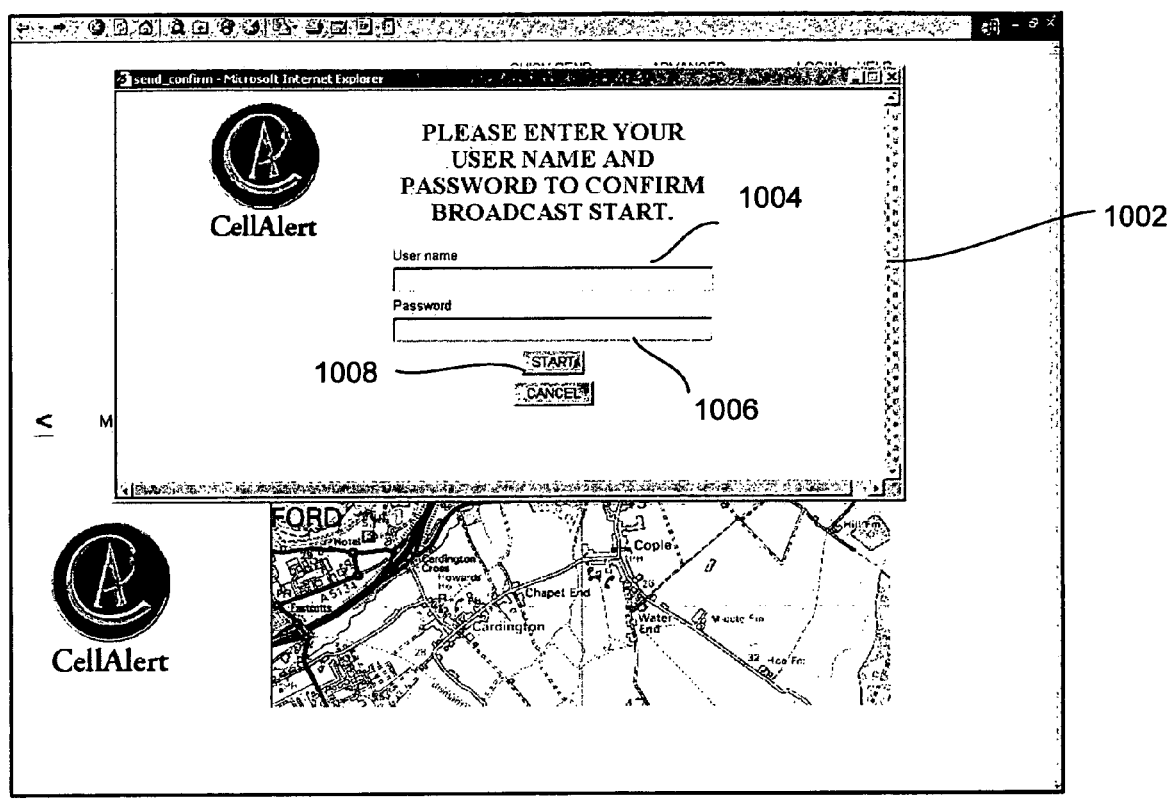
FIG. 10 is a screen shot of the Broadcast Agent Portal Webpage illustrating a Broadcast Agent Confirmation Entry prompt/window.

After the Broadcast Agent defines or selects the message to be broadcast and the target broadcast area, the Broadcast Agent authenticates the Broadcast Request through one or more authentication procedures. These may include entering a User ID and Password, speaking a voice authentication message, or otherwise. FIG. 10 illustrates the display image 1000 and authentication window 1002 that enables the Broadcast Agent to enter and confirm his Broadcast Agent's user identification 1004 and authorization password 1006. After the Broadcast Request has been authenticated, the Broadcast Agent initiates the Broadcast Request by pressing a start button 1008 and the Broadcast Request becomes a Broadcast Proposal and is forwarded to the Public Service Location Broadcast System Service Bureau (PLBS-SB) 102 for consideration by Admission Control 220.

Optional system features may also be made available to the Broadcast Agent via the Broadcast Agent Web Portal 202 or Web Page 106. These may be implemented as additional options on an Advanced button or the toolbar. These optional features may include:

Broadcast Target Area/Footprint library
Message library
Multiple language messages
Long messages
Start time, Stop time
Channel codes
Recall messages
Select networks
Progress windows The Broadcast Agent Web Portal 202 and Web Page 106 may provide one or more progress windows.

Once the Broadcast Agent has clicked the GO-button 1008, and accepted liability for the message by typing his User ID 1004 and password 1006, the message is not transmitted directly. Instead it is sent to the PLBS-SB's administrations subsystem where the Broadcast Agent is validated for authority for this message. For example, the message has been defined for transmission within his jurisdiction. There may be restrictions on how many messages one individual or center may send in a period. This may be defined by the local carriers, government entities, or by the PLBS-SB 102 operator.

Billing for the service may be based on the area that was defined for the message, or the population density of the broadcast target area for the message. In each case, the Broadcast Agent may want to know what the message is costing before deciding to proceed.

The Broadcast Agent's request and message are validated by the administration subsystem to ensure compliance with all agreements with government authorities and the local carriers. Only in the case of full compliance does the message proceed. If so, a dialogue box confirms when each local carrier has accepted the message.

If not, then the Broadcast Agent will get a dialogue box explaining why the message was declined and a suggestion as to what to do next to get the message sent quickly. For example, a smaller less ambitious Broadcast Target Area/Footprint may be tried, or perhaps authorization from a higher ranking Broadcast Agent.

Alternatively, when a web-based interface cannot handle a particular application or situation, the Advanced Broadcast Controller 108 (ABC) may provide this functionality. This third party application, can call on more, perhaps confidential information to define the broadcast area. In this way, the confidential information never leaves the building.

At the local carrier's office, there is a Carrier Broadcast Center (CBC) 114 server that correlates the cell Latitude and Longitude data received from the PLBS-SB with the locally provided Cell ID data for that carrier's network. A cell serving area map or table is derived from a local carrier's planning tool, systems, and data. Typically, a carrier's engineering group prepares similar information for planning, maintenance and administration purposes.

Location broadcast messages are broadcast by Cellular Network Operators on a per-cell basis over a location broadcast channel. In order to send a location broadcast message, a signal is sent to the Carrier Broadcast Center 114A and 114B. From there, the message is transmitted to the Base Station Controllers (BSC), containing the message to be transmitted, and crucially, the Global Cell IDs of the cells in which the broadcast is to be made, along with some other data such as how often and when the message is to be broadcast.

Cellular operators guard the information about their cells (the cell data) with great care, as the information can be useful to a competitor. They may find the prospect of having this information on multiple unsecured servers to be unacceptable.

According to one embodiment of the PLBS, each carrier maintains and controls access to their own proprietary network data including cell locations and cell serving areas, see FIG. 2. Each carrier receives geographic data defining the target area for the public service broadcast message and determines which transmission links and their associated transmitting locations relate to the target area. Once established, each carrier initiates message broadcasting to only those locations or areas which relate in whole or in part to the broadcast target area. As such, competing carriers do not have access to other carrier's networks or their proprietary network or customer data.

Transmission between PLBS-SB 102 and CBC 114 is achieved with available telecommunication facilities and protocols which may include TCP/IP secure tunneling protocols, security, and authentication. Transmission may be by wireline, wireless, including satellite facilities.

In one embodiment, the PLBS system 100 ensures that the Carrier's cell data is retained by the Carrier in a look up table in the Carrier Broadcast Center 114 at the Local Carrier's office. This includes the Cell Identification Codes of the cells, the Latitude and Longitude positions of their respective Radio Base Station sites and azimuth data for their sectors. Inclusion of cell-sector azimuth data leads to per-cell per-sector resolution, but for the first application per-cell resolution may be good enough considering the small size of modern cells, which are typically 1-3 Km in diameter (about 2 miles). The cell data never leaves the Carrier's Network office. The local carrier such as a mobile service carrier provides the hosting of the cell-broadcast messaging technology, access to the local cell network, and transmission of the cell-broadcast messages to its subscribers. Additionally, the carriers or mobile unit service providers may provide cell-site geographic coverage data either internally or to the PLBS operator to enable the operator GUI interface.

Location broadcast messages may be employed in several ways when numerous operators or carriers in a particular geographical area require the same information in a timely manner. Such information may include text messages relating to emergency situations, and, for 3G cells and phones, pictures of wanted or missing persons, graphical data, maps of problem areas including areas to avoid and escape routes.

Location broadcasting is a function of cellular networks and is defined by the official standardization bodies, such as GSM MoU, (GSM 03.41) UMTS, 3GPP/3GPP2 and IS95 CDMA. Many networks have location broadcast channels defined for their networks which are unused at present for lack of a suitable application.

There is typically more than one carrier or operator providing service in the same area. There is no coordination of cell planning between competing operators, and as such, the Cell layouts and Cell IDs are unique to each carrier. In addition, due to continuous innovation in telecommunication technologies, cell coverage and network capacity, the network design, and size and layout of geographic network systems and cells covering a particular area can be dynamic, e.g., network reconfigurations, cell splits and switch cutovers.

Also, many networks 112 have a hierarchical network or cell structure system, with overlapping patterns of networks or cells of different sizes, such as Umbrella Cells, Macro Cells, Overlaid cells, Micro Cells and Pico cells. They may also have multiple layers of sub-band structure in different frequency bands such as (850-1900 or 900-1800-2 Ghz, with each having unique Cell IDs and different base station spacing.

Multi-network configurations will continue to increase in complexity with the introduction of 3G General Packet Radio Service (GPRS), EDGE, CDMA2000, UMTS and TD-SCDMA. 3G location broadcast messages will be much more capable, so different Cell ID tables are entered for a plain text version of the broadcast message than for a multimedia version.

A single message transmission of about 1 KB may be used by the Carrier for each transmission area or cell. The base station controller transceiver then carries out the repetition of the message for the time required.

User receiving devices may include mobile or cellular phones, PDA's, PC's, etc. Receiving devices may provide a distinct alert ring-tone that continues until the message is acknowledged by a local user. Such features and functions are dependent on the features and functionality of the various receiving devices. Some receiving devices may be configured to receive text messages, graphical data, images, and maps or may be capable of connecting to a designated website that provides additional information.

With one or more embodiments of the current system, special handsets or mobile unit units are not required. Global System for Mobile Communication (GSM) handsets may display a public service message location broadcasting system message as provided by a supporting GSM mobile service provider. Additionally, 3rd Generation mobile unit services providers and mobile unit or cellular devices will display location broadcast messages consistent with the public service message location broadcasting system 100.

A public service message location broadcasting service may also display a public service message location broadcasting system provider insignia or service mark.

Because the public service message location broadcasting system is independent of the mobile carrier's voice and SMS channels, cell-broadcasting will continue to operate during emergencies that result in high calling volume thereby enabling local authorities with a viable communications link for emergency instructions despite interruptions in voice and SMS service.

In operation, the public service location broadcasting system 100 may be provided, in one embodiment, by a method described herein. In the event of a need for a public service message broadcast, an authorized Broadcast Agent enters a password to access the public service message location broadcasting system via a Broadcast Agent System accessing a Broadcast Agent Web Portal from an attached Internet-enabled device. The system recognizes the Broadcast Agent and displays a map or illustration of his jurisdiction.

The Broadcast Agent defines or selects the broadcast target area which may be the entire authorized Broadcast Jurisdiction or may be a portion thereof. The Broadcast Agent constructs a text message indicating the nature of the emergency and/or required action. The Broadcast Agent specifies the length of time the message is to be broadcast and/or received by the receiving devices in the target area. The Broadcast Agent utilizing the Broadcast Agent System confirms and sends the data to the public service message location broadcasting system server.

The public service message location broadcasting system's Broadcast Data Management (BDM) server reformats the data and forwards it to the Carrier Broadcast Center 114 for each of the telecommunication carriers providing service within the broadcast target area.

Each participating Carrier Broadcast Center (CBC) 114 selects one or more sub-networks and/or cell-sectors (such as transmission towers) that serve all or a portion of the target area so that the entire broadcast target area is covered by a broadcast. The CBC 114 broadcasts the message to all receiving devices within its serving area. The CBC 114 broadcast transmission process is repeated for the duration of the alert to accommodate additional devices entering, becoming available, or being activated/powering-on within the target area. Receiving devices located within the broadcast sub-networks or cells receive the public service broadcast message, and may provide an alert and display of the message.

In practice, operation of one or more embodiments may be described by the following example.

It is late at night and a river level is rising to dangerous levels. The local police want to warn the population at risk, the people who live in the area likely to flood. However, since it is night time, they are not watching their televisions or listening to the radio. The senior police officer, or disaster manager, in the position of a Broadcast Agent accesses the public service message location broadcasting system web page 106 that is located at a central site. The officer selects a map of the area that is in danger of flooding. The officer defines or selects a geographic broadcast target area to be notified of the danger. The officer enters a message indicating the nature of the danger and suggested actions such as FLOOD WARNING in your area. The officer initiates the broadcast messaging by following a security procedure and clicks a Go-button 1008.

The PLBS-SB 102 receives the messages, performs a check on the validity of the officer as a Broadcast Agent that is proposing the message for the particular notification or target broadcast area. Once validated, the PLBS-SB 102 sends messages to each of the telecommunication service providers or carriers having networks 112, coverage, or receiving units within the defined coverage area.

Each local telecommunication service provider receives the message and target broadcast area definitions from the broadcast system and initiates transmission of the broadcast message to the particular carrier's transmission networks 112 serving the defined target broadcast area. The local network 112 of the telecommunication service provider broadcasts the message to every active compatible receiving unit active within the defined notification area. Each receiving unit receives the broadcast message and displays the message and may provide a common or unique alerting signal.

When introducing aspects of the invention or embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several aspects of the invention are achieved and other advantageous results attained. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

APPENDIX 1: CODE CHANNEL ASSIGNMENTS

| | |
|---|---|
| 500 | common training, exercise and test channel. |
| 501-650 | Languages listed in order according to ISO 639. |
| 501 | aa Afar |
| 502 | ab Abkhazian |
| 503 | af Afrikaans |
| 504 | am Amharic |
| 505 | ar Arabic |
| 506 | as Assamese |
| 507 | ay Aymara |
| 508 | az Azerbaijani |
| 509 | ba Bashkir |
| 510 | be Byelorussian |
| 511 | bg Bulgarian |
| 512 | bh Bihari |
| 513 | bi Bislama |
| 514 | bn Bengali, Bangla |

-continued

| | |
|---|---|
| 515 | bo Tibetan |
| 516 | br Breton |
| 517 | ca Catalan |
| 518 | co Corsican |
| 519 | cs Czech |
| 520 | cy Welsh |
| 521 | da Danish |
| 522 | de German |
| 523 | dz Bhutani |
| 524 | el Greek |
| 525 | en English |
| 526 | eo Esperanto |
| 527 | es Spanish |
| 528 | et Estonian |
| 529 | eu Basque |
| 530 | fa Persian |
| 531 | fi Finnish |
| 532 | fj Fiji |
| 533 | fo Faeroese |
| 534 | fr French |
| 535 | fy Frisian |
| 536 | ga Irish |
| 537 | gd Scots Gaelic |
| 538 | gl Galician |
| 539 | gn Guarani |
| 540 | gu Gujarati |
| 541 | ha Hausa |
| 542 | hi Hindi |
| 543 | hr Croatian |
| 544 | hu Hungarian |
| 555 | hy Armenian |
| 556 | ia Interlingua |
| 557 | ie Interlingue |
| 558 | ik Inupiak |
| 559 | in Indonesian |
| 560 | is Icelandic |
| 561 | it Italian |
| 562 | iw Hebrew |
| 563 | ja Japanese |
| 564 | ji Yiddish |
| 565 | jw Javanese |
| 566 | ka Georgian |
| 567 | kk Kazakh |
| 568 | kl Greenlandic |
| 569 | km Cambodian |
| 570 | kn Kannada |
| 571 | ko Korean |
| 572 | ks Kashmiri |
| 573 | ku Kurdish |
| 574 | ky Kirghiz |
| 575 | la Latin |
| 576 | ln Lingala |
| 577 | lo Laothian |
| 578 | lt Lithuanian |
| 579 | lv Latvian, Lettish |
| 580 | mg Malagasy |
| 581 | mi Maori |
| 582 | mk Macedonian |
| 583 | ml Malayalam |
| 584 | mn Mongolian |
| 585 | mo Moldavian |
| 586 | mr Marathi |
| 587 | ms Malay |
| 588 | mt Maltese |
| 589 | my Burmese |
| 590 | na Nauru |
| 591 | ne Nepali |
| 592 | nl Dutch |
| 593 | no Norwegian |
| 594 | oc Occitan |
| 595 | om (Afan) Oromo |
| 596 | or Oriya |
| 597 | pa Punjabi |
| 598 | pl Polish |
| 599 | ps Pashto, Pushto |
| 600 | Pt Portuguese |
| 601 | qu Quechua |
| 602 | rm Rhaeto-Romance |
| 603 | rn Kirundi |
| 604 | ro Romanian |
| 605 | ru Russian |
| 606 | rw Kinyarwanda |
| 607 | sa Sanskrit |
| 608 | sd Sindhi |
| 609 | sg Sangro |
| 610 | sh Serbo-Croatian |
| 611 | si Singhalese |
| 612 | sk Slovak |
| 613 | sl Slovenian |
| 614 | sm Samoan |
| 615 | sn Shona |
| 616 | so Somali |
| 617 | sq Albanian |
| 618 | sr Serbian |
| 619 | ss Siswati |
| 620 | st Sesotho |
| 621 | su Sundanese |
| 622 | sv Swedish |
| 623 | sw Swahili |
| 624 | ta Tamil |
| 625 | te Tegulu |
| 626 | tg Tajik |
| 627 | th Thai |
| 628 | ti Tigrinya |
| 629 | tk Turkmen |
| 630 | tl Tagalog |
| 631 | tn Setswana |
| 632 | to Tonga |
| 633 | tr Turkish |
| 634 | ts Tsonga |
| 635 | tt Tatar |
| 636 | tw Twi |
| 637 | uk Ukrainian |
| 638 | ur Urdu |
| 639 | uz Uzbek |
| 640 | vi Vietnamese |
| 641 | vo Volapuk |
| 642 | wo Wolof |
| 643 | xh Xhosa |
| 644 | yo Yoruba |
| 645 | zh Chinese |
| 646 | zu Zulu |
| 646-669 | locally specified purpose or language. |
| 670-699 | International alert channels. |
| 671 | Maritime service channel. |
| 672 | Aeronautical service channels. |
| 673 | Amateur service channels. |
| 674 | Scientific services. |
| 690-699 | UN and International Organisations. E.G. |
| 690 | UNSECORD (UN Security Co-Ordintor.) |
| 691 | UNICEF (Child security) |
| 692 | WFP |
| 693 | WHO |
| 694 | UNHCR |
| 695 | OCHA |
| 696 | Red Cross/Crescent Movement. |

Other channels at the discretion of the networks, and in conjunction with the governmental authorities and other interested parties.

What is claimed is:

1. A public service message broadcast system providing a broadcast message to a broadcast target area, the system comprising:

a broadcast agent access device configured for receiving broadcast agent input geographically defining the broadcast target area and defining the broadcast message;

a carrier broadcast server center configured for receiving the broadcast target area and broadcast message, converting the broadcast target area to network addresses of particular network transmission devices serving the broadcast target area including determining the particular network transmission devices serving at least a portion of the broadcast target area, and identifying the network addresses for each determined particular network transmission device and transmitting the broadcast message and not the broadcast target area to the network addresses of the particular network transmission devices for transmission by the particular network transmission devices to user receiving devices located within the broadcast target area; and a broadcast service bureau communicatively coupled to said carrier broadcast center and said broadcast agent access device, said broadcast service bureau configured for receiving the broadcast agent input including the geographically defined broadcast target area and the broadcast message from the broadcast agent access device and transmitting the broadcast message and the broadcast target area to the carrier broadcast server center, wherein the broadcast service bureau verifies an authority of the broadcast agent to transmit the broadcast message to the broadcast target area as a function of a broadcast message jurisdiction of the broadcast agent including the defined broadcast target area.

2. The system of claim 1 wherein the access device provides a broadcast agent with geographic data for defining the geographically defined broadcast target area and a shape tool for defining an irregular shaped broadcast target area, and wherein the geographic data includes a map and wherein the broadcast target area is defined as a function of the map.

3. The system of claim 1, further comprising a plurality of user receiving devices configured for receiving messages from one or more of the network transmission devices, said carrier broadcast center transmitting the broadcast message and not the broadcast target area to the particular network transmission devices for transmission to those user receiving devices located within the serving areas of the particular network transmission devices.

4. The system of claim 3 wherein the user receiving devices are each selected from the group consisting of a personal computer, a wireline telephone, a mobile telephone, and a personal digital assistant device.

5. The system of claim 1 wherein said broadcast service bureau configured to transmitting the broadcast message and the broadcast target area to the carrier broadcast center responsive to the authority verification.

6. The system of claim 1 wherein the broadcast agent access device is a first broadcast agent access device hosting a first webpage for receiving first input from a first broadcast agent, further comprising a broadcast controller providing a second broadcast agent access device for receiving second broadcast agent input from a second broadcast agent defining a second broadcast target area and a second broadcast message.

7. The system of claim 1 wherein the network transmission devices are wireless transmitters within a wireless mobile network having a plurality of individual wireless cell sites each serving a geographic serving area, and wherein the network addresses are the cell ids of the cell sites and wherein the geographic serving areas of the network transmission devices are the individual wireless cell sites served by the wireless transmitters and wherein the user receiving devices are wireless telephone receiving devices.

8. The system of claim 1 wherein there are two or more carrier broadcast centers each of which is associated with one or more network operators having different network transmission devices and wherein the broadcast service bureau is coupled to each of the carrier broadcast centers, the broadcast service bureau transmitting the broadcast message and the broadcast target area to each carrier broadcast center as a function of the broadcast target area and the broadcast message.

9. The system of claim 1 wherein the carrier broadcast center transmits the broadcast message using the network addresses of the particular network transmission devices and wherein following the conversion of the broadcast target area into the network addresses, the carrier broadcast system does not transmit the broadcast target area.

10. The system of claim 1 wherein the carrier broadcast service bureau further includes a distributor receiving the broadcast message and broadcast target area and maps the broadcast target area to determine which one or more broadcast distribution networks from among a plurality of broadcast distribution networks provide broadcast distribution systems serving the broadcast target area, and wherein the distributor identifies the broadcast distribution networks for the broadcast target area and determines whether the broadcast distribution network has its own carrier broadcast center.

11. The system of claim 1 wherein the broadcast agent access device is configured to identify one or more cell broadcast channel codes to be used for the broadcasting of the broadcast message to the defined broadcast target area, wherein the broadcast service bureau is configured to receive the identified cell broadcast channel codes and transmitting the received cell broadcast channel codes to the carrier broadcast center with the broadcast message, and wherein the carrier broadcast center is configured to transmit the received cell broadcast channel codes with the broadcast message to the network addresses for transmission of the broadcast message by the particular network transmission using cell broadcast channels associated with the received cell broadcast channel codes.

12. The system of claim 1 wherein the carrier broadcast center transmits the broadcast message and the broadcast target area using the network addresses of the particular network transmission devices following the conversion of the broadcast target area into the network addresses.

13. A public service message broadcast service bureau system providing a broadcast message to network transmission devices serving a broadcast target area, the system comprising:

a first communication interface coupled to a first network;

a second communication interface coupled to a second network;

a webpage receiving broadcast agent input from a broadcast agent, agent input including a geographically defined broadcast target area defined as a subset of a broadcast transmission serving area and the broadcast message; and a computer hosting the webpage over the first communication interface, said computer receiving the broadcast agent input, verifying an authority of the broadcast agent to transmit the broadcast message to the broadcast target area and transmitting over the second communication interface the broadcast message and the broadcast target area to a carrier broadcast center serving one or more local broadcast transmission systems, the carrier broadcast center receiving the broadcast target area and broadcast message, converting the broadcast target area to network addresses of network transmission devices serving the broadcast target area including determining only particular network transmission devices serving at least a portion of the broadcast target area, and identifying the network addresses for each particular network transmission device and transmitting the broadcast message and not the broadcast target area to the network addresses of the particular network transmission devices for transmission by the particular network transmission devices to user receiving devices located within the broadcast target area, wherein the computer verifies an authority of the broadcast agent to transmit the broadcast message to the broadcast target area as a function of a broadcast message jurisdiction of the broadcast agent including the defined broadcast target area.

14. The system of claim 13 wherein the webpage provides a broadcast agent with geographic data presented as a map and wherein the broadcast target area is defined as a function of the map and wherein the webpage includes a shape tool for defining an irregular shaped broadcast target area.

15. The system of claim 13 wherein said system configured for transmitting the broadcast message to a local broadcast system being responsive to the authority verification.

16. The system of claim 13 wherein the computer further includes a distributor receiving the broadcast message and broadcast target area and maps the broadcast target area to determine which one or more broadcast distribution networks from among a plurality of broadcast distribution networks provide broadcast distribution systems serving the broadcast target area, and wherein the distributor identifies the broadcast distribution networks for the broadcast target area and determines whether the broadcast distribution network has its own carrier broadcast center.

17. The system of claim 13 wherein the computer maps the broadcast target area into network addresses and transmits the broadcast message using the mapped network addresses for direct network addressing of the broadcast message to remote selectors for distribution of the broadcast message within the one or more local broadcast transmission systems that serve the broadcast target area.

18. The system of claim 13 wherein the webpage is configured to receive broadcast agent input that includes one or more cell broadcast channel codes to be used for the broadcasting of the broadcast message to the defined broadcast target area, wherein the computer is configured to transmit the webpage received cell broadcast channel codes over the second communication interface to the carrier broadcast center with the broadcast message, and wherein the carrier broadcast center is configured to transmit the received cell broadcast channel codes with the broadcast message to the identified network addresses for transmission by the particular network transmission devices using cell broadcast transmission channels associated with the received cell broadcast channel codes.

19. A website interface system for a public service message broadcasting system comprising:

a broadcast agent device that includes a display for displaying a broadcast agent webpage;

a webpage host that communicates with the broadcast agent device and that establishes a communications interface between the broadcast agent device and the webpage host;

said broadcast agent device receiving broadcast agent input geographically defining the broadcast target area as a subset of a broadcast transmission serving area and defining the broadcast message, said broadcast agent device transmitting the broadcast target area and the broadcast message to the webpage host over the communication interface, the webpage host configured for verifying an authority of the broadcast agent including a broadcast message jurisdiction of a particular broadcast agent includes the broadcast target area prior to transmitting the broadcast message; and a carrier broadcast center converting the broadcast target area to network addresses of particular network transmission devices serving the broadcast target area after verification of the authority and transmitting the broadcast message and not the broadcast target area to the network addresses.

20. The system of claim 19 wherein the webpage provides a broadcast agent with geographic data, wherein the geographic data includes a map and wherein the broadcast target area is defined as a function of the map, and wherein the webpage includes a shape tool for defining an irregular shaped broadcast target area.

21. The system of claim 19 wherein the broadcast agent device is selected from the group consisting of a personal computer, a wireline telephone, a mobile telephone, and a personal digital assistant device.

22. The system of claim 19 wherein the broadcast agent device is configured to receive broadcast agent input including one or more cell broadcast channel codes to be used for the broadcasting of the broadcast message to the defined broadcast target area, and wherein the broadcast agent device transmits the received one or more cell broadcast channel codes with the broadcast message and the broadcast target area over the communication interface.

23. A method of public service broadcast messaging to a broadcast target area, the method comprising:

hosting a broadcast agent webpage;

receiving a geographically defined broadcast target area and a broadcast message from the broadcast agent webpage;

verifying an authority of a broadcast agent accessing the broadcast agent webpage and generating the broadcast message, the verifying including determining that a broadcast message jurisdiction of the broadcast agent includes the defined broadcast target area;

converting the broadcast target area to network addresses of one or more network transmission devices, said converting including determining the network transmission devices providing transmission service to at least a portion of the broadcast target area and identifying the network address for each determined network transmission device, and said converting only taking place following a verification of the authority of the broadcast agent for generating the broadcast message; and transmitting the broadcast message and not the broadcast target area to the network addresses of the determined network transmission devices for transmission of the broadcast message to user receiving devices geographically located within the transmission service area of at least one of the determined network transmission devices.

24. The method of claim 23 wherein transmitting the broadcast message includes transmitting the broadcast message and the broadcast target area to a carrier broadcast center, wherein the carrier broadcast center performs the converting and transmits the broadcast message and not the broadcast target area to the particular network transmission devices.

25. The method of claim 23 wherein the broadcast agent webpage provides the broadcast agent with a map, wherein the broadcast agent webpage enables the broadcast agent to define a broadcast target area with an irregular shape as a subset of the provided map.

26. The method of claim 23, further comprising receiving the broadcast message and not the broadcast target area at a user receiving device as a function of the user receiving device being located within the geographic service area of at least one of the particular network transmission devices.

27. The method of claim 23 wherein the broadcast message jurisdiction includes a geographic parameter defining an authorized broadcast agent broadcasting area.

28. The method of claim 23 wherein the network transmission devices are wireless transmitters within a wireless mobile network having a plurality of individual wireless cell sites each serving a geographic serving area and wherein the geographic serving areas of the network transmission devices are the individual wireless sites served by the wireless transmitters and wherein the user receiving devices are wireless telephone receiving devices.

29. The method of claim 23, further comprising selecting one or more network operators from among a plurality of network operators serving the broadcast target area and sending the broadcast message and the broadcast target area to a carrier broadcast center associated with the selected network operators for performing the converting and transmitting.

30. The method of claim 23 wherein transmitting the broadcast message to the network addresses of the determined network transmission devices does not include transmitting the broadcast target area to the network transmission devices.

31. The method of claim 23 wherein receiving from the broadcast agent webpage one or more cell broadcast channel codes to be used for broadcast transmission of the broadcast message, and wherein transmitting the broadcast message to the network addresses includes transmitting the one or more cell broadcast channel codes for transmission of the broadcast message by the determined network transmission devices using cell broadcast transmission channels associated with the received cell broadcast channel codes.

32. The method of claim 23 wherein transmitting includes transmitting the broadcast target area with the broadcast message to the network addresses of the determined network transmission devices.

* * * * *